(12) United States Patent
Stöckli

(10) Patent No.: US 12,531,956 B2
(45) Date of Patent: Jan. 20, 2026

(54) DEVICE AND METHOD FOR IMPROVING THE REPRODUCIBILITY OF RECORDINGS

(71) Applicant: CI Tech Sensors AG, Burgdorf (CH)

(72) Inventor: Armin Stöckli, Ittigen (CH)

(73) Assignee: CI TECH SENSORS AG, Burgdorf (CH)

( * ) Notice: Subject to any disclaimer, the term of this patent is extended or adjusted under 35 U.S.C. 154(b) by 113 days.

(21) Appl. No.: 18/273,374

(22) PCT Filed: Jan. 19, 2022

(86) PCT No.: PCT/EP2022/051087
§ 371 (c)(1),
(2) Date: Oct. 5, 2023

(87) PCT Pub. No.: WO2022/157174
PCT Pub. Date: Jul. 28, 2022

(65) Prior Publication Data
US 2024/0121348 A1 Apr. 11, 2024

(30) Foreign Application Priority Data

Jan. 20, 2021 (EP) .................... 21152490

(51) Int. Cl.
*H04N 1/04* (2006.01)
*H04N 1/028* (2006.01)
*H04N 1/031* (2006.01)

(52) U.S. Cl.
CPC ......... *H04N 1/031* (2013.01); *H04N 1/02815* (2013.01); *H04N 1/02895* (2013.01)

(58) Field of Classification Search
None
See application file for complete search history.

(56) References Cited

U.S. PATENT DOCUMENTS 5,055,921 A * 10/1991 Usui ................... H04N 25/136
348/E9.01
6,320,680 B1 * 11/2001 Rhoads ................... H04N 1/04
358/444

(Continued)

FOREIGN PATENT DOCUMENTS

WO 9935618 A1 7/1999
WO 2022157174 A1 7/2022

OTHER PUBLICATIONS

International Search Report dated Mar. 14, 2022, filed in the corresponding PCT Application; 5 pages.

(Continued)

*Primary Examiner* — Cheukfan Lee
(74) *Attorney, Agent, or Firm* — Black McCuskey

(57) ABSTRACT

A device and method for improving the reproducibility of image captures are provided. The device comprises a guide device (1) configured to guide at least one object (2) in an object plane (1*a*); at least one driving device (3) configured to transport the object (2) in the object plane (1*a*) in a transport direction (8); an image plane (5); at least one contact image sensor comprising at least one light source (4) for illuminating the object (2); a plurality of rod-shaped lenses (6) arranged between the object plane (1*a*) and the image plane (5) and in a row along a direction transverse to the transport direction (8) of the object (2); and at least one light-sensitive in-line pixel array (7) arranged in the image plane (5); a control device (9) configured to control at least one of the light source (4) and the light-sensitive in-line pixel array (7) and to capture a signal generated by the light-sensitive in-line pixel array (7). A light emitted from the light source (4) may be at least partially scattered by the object (2) toward the rod-shaped lenses (6), imaged by means of the rod-shaped lenses (6), and incident on at least a region of the light-sensitive in-line pixel array (7). The (Continued)

Figure 1A:

photosensitive in-line pixel array (7) may comprise a plurality of one-dimensional in-line pixel arrays (7a, 7b), each extending along the direction transverse to the transport direction (8) of the object (2), arranged parallel to each other and adjacent to each other. Each in-line pixel array (7a, 7b) may comprise a length transverse to the transport direction (8) of the object (2) that completely covers the object (2) to be captured.

32 Claims, 7 Drawing Sheets

(56) References Cited

U.S. PATENT DOCUMENTS

| | | |
|---|---|---|
| 2002/0093694 A1 | 7/2002 | Spears |
| 2002/0093697 A1* | 7/2002 | Spears .................. H04N 1/486 |
| | | 358/514 |
| 2002/0181033 A1* | 12/2002 | Tandon ................. H04N 1/486 |
| | | 358/514 |
| 2003/0122920 A1* | 7/2003 | Takagi .................... B41J 2/451 |
| | | 347/258 |
| 2004/0190088 A1* | 9/2004 | Kakuta ................ H04N 1/1065 |
| | | 358/474 |
| 2005/0045809 A1 | 3/2005 | Spears |
| 2005/0161583 A1 | 7/2005 | Matsumoto |
| 2005/0254097 A1* | 11/2005 | Schweid ........... H04N 1/00092 |
| | | 356/239.8 |
| 2012/0307325 A1* | 12/2012 | Tagawa ................. H04N 1/401 |
| | | 358/518 |
| 2017/0013151 A1* | 1/2017 | Yamada .................. H04N 1/12 |
| 2024/0121348 A1* | 4/2024 | Stöckli ............... H04N 1/02895 |

OTHER PUBLICATIONS

Written Opinion dated Mar. 14, 2022, filed in the corresponding PCT Application; 7 pages.

Seite et al., Industrial Contact Image Sensor Bedienungsanleitung V 4.00, dated Jun. 26, 2017, Retrieved from the Internet: https://tichawa-vision.de/pdf/manual_de.pdf [retrieved on May 23, 2019] XP055591501.

* cited by examiner

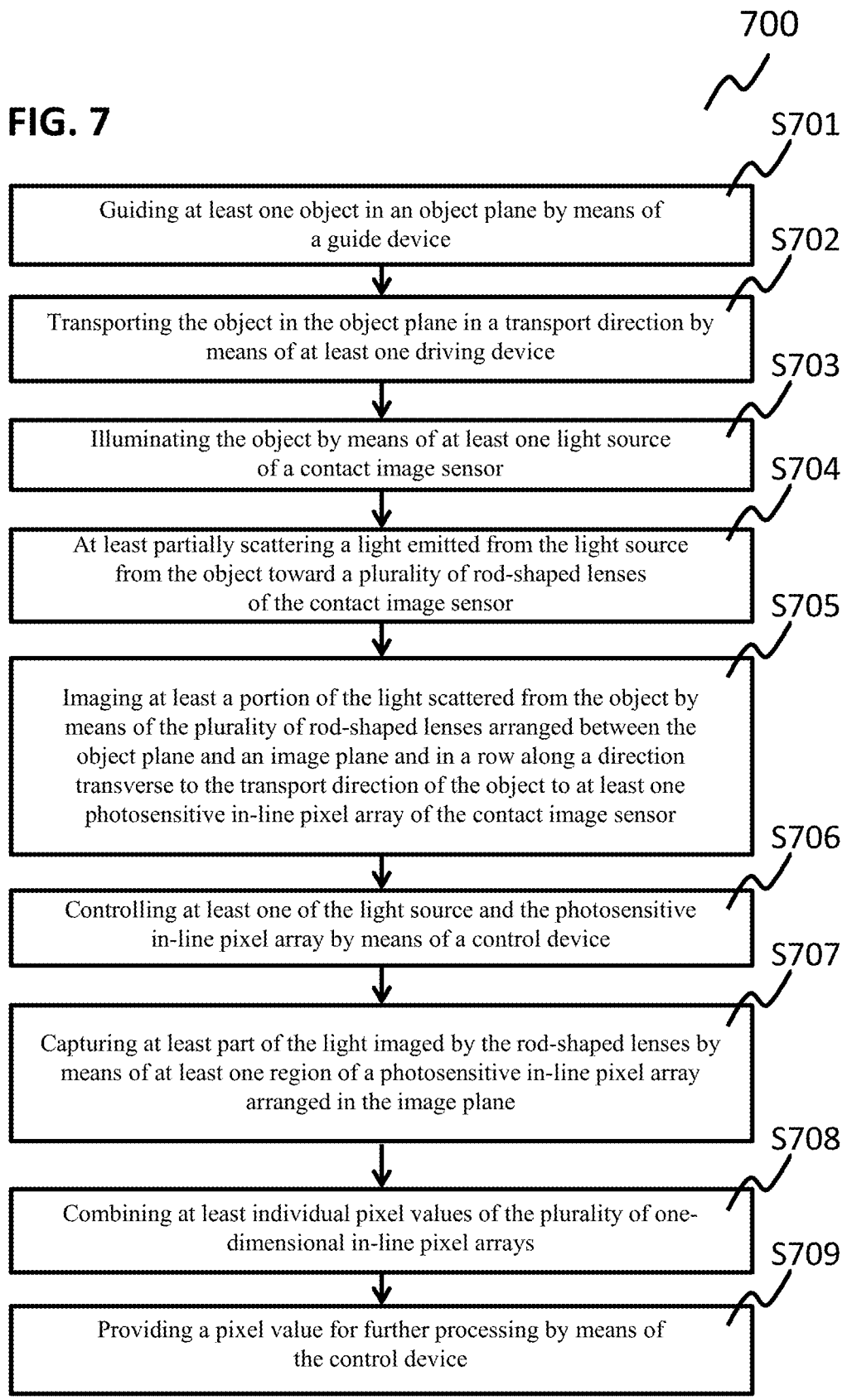

DEVICE AND METHOD FOR IMPROVING THE REPRODUCIBILITY OF RECORDINGS

The invention relates to a device and a method for improving the reproducibility of image captures, by means of which it is possible to reduce or remove the moiré effect.

The moiré effect is an optical effect in which the superposition of periodic rasters or patterns results in a raster or pattern that is periodic in turn, comprising special structures that are not present in any of the individual rasters and vary when the superposition method is changed. This effect may occur when at least two rasters are superposed, which may be relatively fine. It is a type of optical interference that may create certain rasters that usually have an impact that appears quite coarse. The moiré effect may be compared to an optical illusion. The moiré effect may occur in image processing whenever two or more rasters are superposed, for example in the case of capturing at least one banknote by means of at least one image sensor when subjects with a periodic structure are captured. An image sensor may also record individual pixels based on a specific raster. Three periodic rasters may be encountered in the processing of banknotes. For example, a banknote may comprise locally parallel lines. For example, when processing banknotes, periodic scanning may occur in the transport direction. Further, when processing banknotes, periodic scanning may occur, for example, in the in-line direction. Due to the locally parallel lines and the periodic scanning in the transport direction, a moiré effect may occur if, for example, a scan is incomplete. Due to the local parallel lines and the periodic scanning in the in-line direction, for example, no moiré effect is generated if a scanning in the in-line direction has no, or only small, negligible gaps.

Figure 1B:
Figure 1C:

In each of FIG. 1A, FIG. 1B and FIG. 1C, a (always the same) 50-euro banknote 100 is shown, which has been imaged or captured in three different positions by means of an image sensor, for example by means of a conventional contact image sensor. For example, a 50-euro banknote 100 has a plurality of line structures extending in one direction below the arched bridge depicted thereon, see arrows 102*a* and 102*b* in FIG. 1A, FIG. 1B, FIG. 1C. If the 50-euro banknote 100 is imaged, for example, by means of a scanner or banknote reader when the banknote 100 is moved at an angle, for example, at different angles to a transport direction of the 50-euro banknote 100, and/or with different scans, the moiré effect may arise as an interaction between the structures located on the subject and the scanning structure, which at least one image sensor, for example, a conventional contact image sensor of a scanner, has, in very different patterns (see, for example, arrows 102*a* and 102*b* in FIG. 1A, FIG. 1B and FIG. 1C). Due to the different angles or small shifts of the scan in which the 50 euro banknote 100 is captured by the image sensor, different unwanted moiré effect patterns are formed in each case. If the 50-euro banknote 100 is now imaged with a fine pattern, the raster of the capture from the image sensor and the raster created by the fine pattern of the banknote interfere with each other.

The differences in FIG. TA, FIG. 1B and FIG. 1C occur mainly because of the different banknote skew often present in practice and/or the different phasing of the scanning raster to the periodic lines and a pixel area that is too small compared to the scanning step. In principle, pixels that are too large compared to the scanning step may also lead to moiré effects.

As a result, the measurements are not reproducible, because in certain regions of the captured image, a dot may be measured as dark at one time and light at another, even if the capturing conditions such as skew or different phasing of the scanning screen to the periodic lines change only slightly and thus cannot be controlled. Furthermore, RGB color values may not be measured at the same position due to time multiplexing at, for example, 100 dots per inch (dpi, dots per inch), which may result in reduced accuracy of hue measurements, such as speckling in the captured image. Also, a Nyquist criterion may not be met in a transport direction of a banknote, for example, at a resolution of 50 dpi captured at various skews, which may result in low accuracy in the printed area. Consequently, reproducibility of image captures, for example of banknotes, cannot be guaranteed.

There is therefore a need for a device and a method for improving the reproducibility of image captures that are capable of reducing or even removing an unwanted moiré effect when imaging at least one banknote, for example. In particular, the device and the method are intended to enable moiré-free imaging of, for example, banknotes. Furthermore, by means of the device and method described herein, a moiré-free imaging of banknotes is to be made possible by adapting a scan in the transport direction. By means of the device and method described herein, an image reproducibility should be improved. By means of the device and method described herein, independence of the images of a banknote from different skew and/or from different scanning locations is to be achieved. By means of the device and method described herein, a plurality of recording modes may be set. By means of the device and method described herein, a larger scanning area may be achieved. By means of the device and method described herein, the reproducibility of imaging a banknote may be improved. Further, by means of the device and method described herein, a signal-to-noise ratio may be improved.

Various embodiments provide a device and method for improving image capture reproducibility.

Various embodiments provide a device for improving the reproducibility of image captures. The device may comprise a guide device configured to guide at least one object on an object plane. The device may further comprise at least one driving device configured to transport the object on the guide device in the object plane in a transport direction. The device may comprise an image plane. The device may comprise a contact image sensor comprising at least one light source for illuminating the object. The light source may be time-division multiplexed such that different wavelengths are emitted at different times in UV, in visible light, in infrared, or combinations thereof. The light source may be located on the same side with respect to the object plane, for example in the case of reflected light measurement, and/or on the opposite side, for example in the case of transmitted light measurement, as the image plane. The transmitted light measurement may be a bright field and/or dark field configuration. The contact image sensor may comprise a plurality of rod-shaped lenses arranged between the object plane and the image plane and in a row along a direction transverse to the transport direction of the object. The contact image sensor may comprise at least one light-sensitive in-line pixel array arranged in the image plane. The device may comprise at least one control device configured to control at least one of the light source and the light-sensitive in-line pixel array, and to capture a signal generated by the light-sensitive in-line pixel array. A light emitted from the light source may be at least partially scattered from the object toward the rod-shaped lenses, imaged by means of the rod-shaped lenses, and incident on at least a region of the light-sensitive in-line pixel array. The photosensitive in-line pixel array may comprise a plurality of one-dimensional in-line pixel arrays. The in-line pixel arrays may each extend along the direction transverse to the transport direction of the object, be parallel to each other, and be arranged adjacent to each other. Each in-line pixel array may comprise a length transverse to the transport direction of the object that completely covers the object to be captured.

In various embodiments, the light source may be on the same side (incident light measurement) and/or the opposite side (transmitted light measurement) with respect to the object plane as the image plane. The transmitted light measurement may be a bright and/or dark field configuration.

In various embodiments, the light-sensitive in-line pixel array may comprise at least one photodiode in-line pixel array.

In various embodiments, a number of in-line pixel arrays may be less than a number of pixels in each in-line pixel array.

In various embodiments, a contact image sensor may comprise an in-line pixel array having, for example, about 800 pixels in a line and may comprise, for example, two lines.

In various embodiments, the object may be a security, such as a banknote or a check.

In various embodiments, the device may be a securities reader, such as a banknote and/or check reader.

In various embodiments, the driving device may comprise a plurality of rollers and at least one drive motor. The drive motor may be configured to drive at least one roller, such as a drive roller, such that at least one object may be driven along the transport direction on the guide device in the object plane and transported by means of guide rollers.

In various embodiments, the at least one light source may be a light emitting diode (LED) light source, such as a monochrome LED or an RGB LED for color illumination of an object in the object plane. In various embodiments, the light source may comprise a plurality of light sources in a direction perpendicular or transverse to a transport direction. In various embodiments, the at least one light source may comprise at least one diode rod with light output.

In various embodiments, the at least one light source may be configured as a light guide with light output that may be laterally fed with LEDs of different wavelengths.

In various embodiments, a rod-shaped lens may be, for example, a cylindrical lens.

In various embodiments, at least one rod-shaped lens may be formed as a gradient index lens. In various embodiments, at least one rod-shaped lens may be formed as a gradient index rod-shaped lens. The at least one rod-shaped lens may comprise a cylindrical shape, wherein the two end surfaces may be polished and the peripheral surface may be optically irrelevant.

In various embodiments, a rod-shaped lens may contain various optical materials, for example, glasses such as fused silica, but also crystalline materials or plastics. The rod-shaped lenses may comprise a diameter in a range of values from about 0.1 millimeters to 2 millimeters and, for example, a range of lengths from 2 millimeters to 50 millimeters. In various embodiments, a rod-shaped lens may have at least a simple structure and allow for easy handling and may be coated using various coatings.

In various embodiments, at least one rod-shaped lens may be configured as a SELFOC® microlens, such as a flat gradient index lens. The refractive index change in the material may be produced herein by an ion exchange. In various embodiments, at least one lens may be configured as a linear array of gradient index lenses or as a plurality of parallel arrays.

In various embodiments, a rod-shaped lens may image an object plane object strip onto an image plane image strip.

In various embodiments, a one-dimensional in-line pixel array may be a photosensitive CMOS array.

In various embodiments, a one-dimensional in-line pixel array may be a photosensitive CCD array.

In various embodiments, the contact image sensor and/or the photosensitive in-line pixel array may comprise a compact design with a resolution of up to about 600 dpi. A resolution of a line array may be determined using a pixel pitch.

In various embodiments, the device may further comprise a housing.

In various embodiments, the at least one light source may be operated by means of time multiplexed illumination. In other words, for example, during a first time step it may be illuminated with the color blue, during a second time step it may be illuminated with the color green, during a third time step it may be illuminated with the color red, and during a fourth time step it may be illuminated with infrared. During each illumination step, a line, for example a CMOS line or a CCD line, may measure at least one pixel value and export received data analog or digital, for example to a control device and/or to a memory.

In various embodiments, the contact image sensor and/or the photosensitive in-line pixel array may comprise at least two photosensitive lines. The two lines may be operated independently or together, for example by means of a control device. In other words, the control device may supply and operate a first row with a supply voltage or current. The control device may supply and operate a second row with a supply voltage or current. The control device may operate the first row and the second row individually. For example, the control device may turn off or ground one row to a ground potential to save energy, for example. However, three rows, four rows, five rows, or even more rows may be provided.

In various embodiments, the contact image sensor and/or the photosensitive in-line pixel array may comprise a resolution of about 50 dpi or 100 dpi or 200 dpi and may be operated at the various resolutions.

In various embodiments, a device may comprise at least a plurality of contact image sensors, such as at least a pair of contact image sensors. The contact image sensors may be arranged adjacent to each other along a transport direction of an object. The contact image sensors may each comprise a width such that they each fully capture or cover an object to be inspected, such as a check or a banknote. The at least one pair of contact image sensors may be operable by means of reflected light operation.

In various embodiments, the contact image sensor and/or the photosensitive in-line pixel array may comprise a resolution of about 100 dpi or 200 dpi or 300 dpi or 600 dpi and may be operated at the various resolutions.

In various embodiments, the contact image sensor and/or the photosensitive in-line pixel array may be operated using an analog binning process. In an analog binning process, a charge collected in the quantum wells may be physically combined by a plurality of pixels. In an analog binning process, capacitances may be connected in parallel and read out by a control device, for example. In the devices and methods described herein, the analog binning method is preferably used. By means of the analog binning method, data reduction may be achieved because fewer pixels need to be read out. Furthermore, by means of the analog binning method, a line readout time may be shortened and the amount of data may be reduced, which may reduce a need for memory and a computing power. In addition, analog binning improves the signal-to-noise ratio.

In various embodiments, the contact image sensor and/or the photosensitive in-line pixel array may be operated using a digital binning process. In a digital binning process, pixel values may be read from the pixels, digitized, added and, for example, optimally averaged.

In various embodiments, the contact image sensor and/or the photosensitive in-line pixel array may be operated using a physical binning process, for example, to achieve data reduction. In the physical binning method, fewer pixels need to be read out, which may shorten the line readout time and reduce the amount of data, which may reduce the need for memory and computing power.

For example, in various embodiments, three pixels may be combined in a 600 dpi contact image sensor and/or a photosensitive in-line pixel array in a 200 dpi mode. As a result, a readout time for a line may typically be three times shorter, and thereby banknotes may be transported faster in a device described herein.

In various embodiments, a resolution of 200 dpi may be required for check processing in accordance with rules and regulations.

In various embodiments, the control device may read each line individually or a plurality of lines approximately simultaneously.

In various embodiments, a line may be configured as a CMOS line scan camera.

In various embodiments, moiré-free captures may be realized using a 200 dots per inch contact image sensor and/or a photosensitive in-line pixel array when a line is operated in 100 dpi mode using a binning process and scanning in the transport direction is also performed at a resolution of 100 dpi.

In various embodiments, using a 600 dpi contact image sensor and/or an in-line pixel array, if a resolution of 300 dpi, 200 dpi, 100 dpi, etc., results in a line by means of a binning process, moiré-free scanning with the same resolution as in the line may be possible.

In various embodiments, the control device may comprise a memory in which at least one pixel value of a plurality of pixel values of at least one row and/or both rows may be stored.

In various embodiments, the plurality of one-dimensional in-line pixel arrays may be fixedly positioned, for example, on a housing of the device, and the object, for example, a check or banknote, may be transported in a narrow gap, for example, in a range of values from about 0.1 mm to about 5 mm, for example, in a range of values from about 0.15 mm to about 3 mm, for example, in a range of values from about 0.2 mm to about 1.5 mm.

In various embodiments, a depth of field of a contact image sensor and/or a photosensitive in-line pixel array may be in a range of values from about 0.05 millimeters to about 5 millimeters, for example in a range of values from about 0.075 millimeters to about 3 millimeters, for example in a range of values from about 0.1 millimeters to about 1.6 millimeters.

Various embodiments provide a device for improving the reproducibility of captures, wherein each in-line pixel array comprises a plurality of pixels, and each pixel comprises at least one photodiode, such as a photosensitive photodiode, of CMOS design for capturing a pixel value of light emitted from the light source.

In various embodiments, the contact image sensor and/or the photosensitive in-line pixel array may be configured comprising two lines or one-dimensional in-line pixel arrays, each comprising a plurality of pixels.

In various embodiments, the controlling device may be configured to read at least one pixel value by controlling at least one pixel in a one-dimensional pixel array.

In various embodiments, the control device may comprise at least one processor and/or field programmable gate array (FPGA).

In various embodiments, the contact image sensor and/or the photosensitive in-line pixel array may be configured to comprise a two-dimensional pixel array line, each pixel of which is individually controllable by means of the control device.

Various embodiments provide a device for improving capture reproducibility, wherein at least a first in-line pixel array and a second in-line pixel array of the plurality of in-line pixel arrays are identically constructed. The first in-line pixel array and the second in-line pixel array may comprise the same number of pixels. The pixel size of the pixels of the first in-line pixel array and the second in-line pixel array may be approximately the same size, such as the same size.

Various embodiments provide a device for improving the reproducibility of captures, wherein at least a second in-line pixel array of the plurality of in-line pixel arrays in the transport direction of the object is made longer, for example, by 10% percent to a factor of 10 longer, for example, by a factor of 7.5 longer, than a first in-line pixel array of the plurality of in-line pixel arrays in the transport direction of the object.

Various embodiments provide a device for improving the reproducibility of captures, wherein at least one pixel in at least one in-line pixel array is configured to be wider across the transport direction than a pixel in at least one other in-line pixel array. For example, a first row may comprise a plurality of pixels of the same size. An adjacent row may comprise pixels of different widths, such as pixels that are twice as wide as pixels in the first row. For example, a second row may comprise a pixel sequence of: a pixel with pixel width of two pixels, a pixel with pixel width of one pixel, a pixel with pixel width of one pixel, a pixel with pixel width of two pixels. This sequence may be repeated in the second row. In a third row, a pixel may comprise a pixel width of: a pixel with pixel width of three pixels. This pixel width may repeat in the third row. In a fourth row, a pixel may comprise a pixel width of six pixels. This width may be repeated in the fourth line.

Various embodiments provide a device for improving the reproducibility of captures, wherein at least one pixel in at least one in-line pixel array may be wider than a pixel in at least one other in-line pixel array. For example, a pixel in a first in-line pixel array may be wider relative to a corresponding pixel in a second in-line pixel array by, for example, a factor of about 1.5 to about a factor of 3.5, such as a factor of 2. In other words, a pixel width in a first row may be twice as wide with respect to a pixel width in a second row.

Various embodiments provide a device for improving the reproducibility of captures in which a sensitivity may be approximately constant, e.g., constant, over the transport distance.

Various embodiments provide a device for improving the reproducibility of captures, wherein the control device is further configured to operate the first in-line pixel array and the second in-line pixel array independently of each other, and, wherein the control device is configured to connect the second in-line pixel array to the first in-line pixel array and vice versa.

Various embodiments provide a device for improving the reproducibility of captures, wherein the plurality of in-line pixel arrays comprises a resolution of 200 dpi in the direction transverse to the transport direction.

Various embodiments provide a device for improving the reproducibility of captures, wherein one in-line pixel array (7a) comprises a resolution of 200 dpi in the direction transverse to the transport direction (8) and a second in-line pixel array (7b) comprises a resolution of 100 dpi in the direction transverse to the transport direction (8).

Various embodiments provide a device for improving capture reproducibility, wherein a pixel of the plurality of in-line pixel arrays has a size in a range of values of about 150 micrometers by about 150 micrometers, for example in a range of values of about 130 micrometers by about 130 micrometers, for example in a range of values of about 127 micrometers by 127 micrometers.

Various embodiments provide a device for improving the reproducibility of captures, wherein the control device is further configured to, in a case where the object is at least one check, set a resolution of the first in-line pixel array to 200 dpi, disable the second in-line pixel array, drive the first in-line pixel array, and read out the pixel values of the first in-line pixel array.

Various embodiments provide a device for improving the reproducibility of captures, wherein the control device is further configured, in the case where the object is at least one check, to reduce a speed of at least one check in the transport direction by means of a transport device so that a check may be transported more slowly in the transport direction to achieve, for example, 200 dpi resolution in the transport direction.

Various embodiments provide a device for improving the reproducibility of captures, wherein the control device is further configured, in a case where the object is at least one banknote, to set a resolution of the first in-line pixel array and the second in-line pixel array to 100 dpi, to activate the first and second in-line pixel arrays, to activate at least one charge collected in quantum wells of two adjacent pixels in the first in-line pixel array, physically combining and reading out pixel values, physically combining and reading out pixel values of at least one charge collected in quantum wells of two adjacent pixels in the second in-line pixel array corresponding to the two adjacent pixels in the first in-line pixel array, and providing a pixel value based on the read-out pixel values for further processing.

Various embodiments provide a device for improving the reproducibility of captures, wherein the control device is configured to set a resolution of the first in-line pixel array and the second in-line pixel array to a value between about 90 dpi to about 130 dpi, for example about 100 dpi.

Various embodiments provide a device for improving the reproducibility of captures, wherein the control device is configured to combine pixel values of two adjacent pixels of a first in-line pixel array and at least one pixel value of an adjacent pixel of a second in-line pixel array using an analog binning method, and to provide a pixel value based on the combined pixel values for further processing.

Various embodiments provide a device for improving the reproducibility of captures, wherein the control device is configured to combine two pixel values of two adjacent pixels of a first in-line pixel array and one pixel value of an adjacent pixel of a second in-line pixel array using an analog three-way binning method, and provide a pixel value based on the combined pixel values for further processing.

Various embodiments provide a device for improving capture reproducibility, wherein the control device is further configured to combine pixel values of two adjacent pixels of the first in-line pixel array and pixel values of two adjacent pixels of the second in-line pixel array corresponding to the two adjacent pixels of the first in-line pixel array using an analog 2×2 binning method, and to provide at least one pixel value based on the combined pixel values for further processing.

Various embodiments provide a device for improving the reproducibility of captures, where higher light sensitivity per virtual pixel may be achieved and a signal-to-noise ratio may be improved.

Various embodiments provide a device for improving the reproducibility of captures, wherein the control device is further configured to enable the first and second in-line pixel arrays, read out at least a first pixel value of a first pixel of the first in-line pixel array and a first pixel value of a first pixel of the second in-line pixel array reading out at least a second pixel value of the second pixel of the first in-line pixel array and a second pixel value of the second pixel of the second in-line pixel array, and calculating in each case an average value by means of a line-averaging acquisition method from the first pixel values and the second pixel values and providing in each case a pixel value for further processing.

Various embodiments provide a device for improving the reproducibility of captures, wherein the control device may be configured to switch between a 100 dots per inch resolution and a 200 dots per inch resolution via software during operation.

Various embodiments provide a device for improving the reproducibility of captures, wherein the device comprises at least a second light source for illuminating the object, the second light source being arranged on an opposite side to the light source with respect to the plurality of rod-shaped lenses, and/or the rod-shaped lenses being gradient index rod-shaped lenses. For example, the light source may illuminate an object from an angle of about 50 degrees with respect to the plane of transport, and the second light source may illuminate the object from an angle of about 60 degrees with respect to the plane of transport. The second light source may be arranged symmetrically with respect to the plurality of rod-shaped lenses with respect to the light source, for example, at the same angle, in an angular range of about 50 to about 60 degrees, with respect to the transport direction.

Various embodiments provide a device for improving the reproducibility of captures, which may comprise a plurality of light sources. For example, the device may be operated in an incident light mode in which at least one light source or plurality of light sources is positioned on the same side as the image plane and operated to illuminate at least one object that may be transported in the device. For example, the device may be operated in a transmitted light mode in which at least one light source is positioned and operated on a side opposite the image plane with respect to the object to trans-illuminate the object. The light source and/or may be operated, for example, in a bright field transmitted light mode. For example, the light source may be operated in a dark field transmitted light mode. In other words, at least one light source may be arranged on the same side (incident light measurement) as the image plane with respect to the object plane and/or at least one light source may be arranged on the opposite side (transmitted light measurement) as the image plane.

Various embodiments provide a device for improving the reproducibility of captures, wherein the rod-shaped lenses may be gradient index rod-shaped lenses.

Various embodiments provide a device for improving the reproducibility of captures, wherein the device comprises a plurality of rows of rod-shaped lenses arranged in series, wherein the rows of rod-shaped lenses are arranged parallel to each other, and wherein the rows are each arranged transverse to the transport device.

Various embodiments provide a device for improving the reproducibility of captures, wherein at least a first row of the plurality of rows of rod-shaped lenses is arranged adjacent to at least one further row of the plurality of rod-shaped lenses, wherein the first row of rod-shaped lenses and the further row of rod-shaped lenses are arranged in a direction transverse to the transport direction of the object at a predefined distance, for example in a value range of about 1 micrometer to 10 micrometers, for example at a distance of 2 micrometers, for example of 4 micrometers for example of 7 micrometers, for example of 9 micrometers, and is arranged at a predefined distance, for example of about half a diameter of a rod-shaped lens, for example in a value range of about 100 micrometers to about 200 micrometers, for example of 130 micrometers to about 170 micrometers, for example at a distance of about 150 micrometers, transversely to the transport direction from each other, and/or at least one space between a rod-shaped lens and an adjacent rod-shaped lens is filled with at least one filler material, for example black silicone wax or black silicone resin, in which the black color may prevent light from the object from falling through the gaps onto the pixel array or light from a rod-shaped lens from entering an adjacent rod-shaped lens.

Various embodiments provide a device for improving the reproducibility of captures, wherein a distance of a rod-shaped lens of a first row to a rod-shaped lens of a second row have in a range of values from about 0 millimeters to about 5 millimeters.

Various embodiments provide a method for improving the reproducibility of captures.

Various embodiments provide a method for improving the reproducibility of captures. The method comprises guiding at least one object in an object plane by means of a guide device. The method comprises transporting the object in the object plane in a transport direction by means of at least one driving device. The method comprises illuminating the object by means of at least one light source of a contact image sensor. The method comprises at least partially scattering a light emitted by the light source from the object towards a plurality of rod-shaped lenses of the contact image sensor. The method comprises imaging at least a portion of the light scattered from the object, by means of the plurality of rod-shaped lenses arranged between the object plane and an image plane and in a row along a direction transverse to the transport direction of the object, to at least one photosensitive in-line pixel array of the contact image sensor. The method comprises controlling at least one of the light source and the in-line pixel light-sensitive array by means of a control device, wherein the in-line pixel light-sensitive array comprises a plurality of one-dimensional in-line pixel arrays each extending along the direction transverse to the transport direction of the object, arranged parallel to each other and adjacent to each other, and wherein each in-line pixel array has a length transverse to the transport direction of the object that completely covers the object to be captured. The method comprises capturing the light imaged by the rod-shaped lenses by means of at least a region of a photosensitive in-line pixel array arranged in the image plane. The method comprises merging at least individual pixel values of the plurality of one-dimensional in-line pixel arrays. The method comprises providing a pixel value for further processing by the control device.

The method for improving the reproducibility of captures may be configured to operate the light source in a time division multiplexed manner.

The method for improving capture reproducibility may be configured to sequentially illuminate the object with a plurality of colors and/or infrared and/or ultraviolet.

The merging of at least individual pixel values of the method may comprise, for example, a merging by means of an analog binning method. The merging by means of an analog binning method may comprise, for example, a 2×2 binning in which two pixel values from a first in-line pixel array and two pixel values from a second in-line pixel array are merged. Merging using an analog binning method may comprise, for example, a three-way binning method in which pixel values of two adjacent pixels in a first in-line pixel array and a pixel value of a corresponding pixel in a second in-line pixel array are merged. The merging of at least individual pixel values of the method may comprise, for example, digital merging, such as digital binning.

The method for improving the reproducibility of captures may include, in a case where the object is at least one check, setting a resolution of the first in-line pixel array to 200 dpi using a controlling device, disabling the second in-line pixel array using a controlling device, controlling the first in-line pixel array using a controlling device, and reading pixel values of the first in-line pixel array using a controlling device.

The method for improving the reproducibility of captures may include, in a case where an object is at least one banknote, setting a resolution of the first in-line pixel array and the second in-line pixel array to 100 dpi by means of the control device, activating the first and the second in-line pixel arrays by means of the control device, physically combining at least one charge collected in potential wells of two adjacent pixels in the first in-line pixel array and reading out pixel values by the control device, physically combining at least one charge collected in potential wells of two adjacent pixels in the second in-line pixel array corresponding to the two adjacent pixels in the first in-line pixel array, and reading out pixel values by the control device, and providing a pixel value based on the read-out pixel values for further processing by the control device.

The method for improving the reproducibility of captures may include combining pixel values of two adjacent pixels of the first in-line pixel array and at least one pixel value of an adjacent pixel of the second in-line pixel array using an analog or digital binning method by a control device, and providing a pixel value based on the combined pixel values for further processing by a control device.

The method for improving the reproducibility of captures may comprise activating the first and the second in-line pixel arrays by means of a control device, reading out at least a first pixel value of a first pixel of the first in-line pixel array and a first pixel value of a first pixel of the second in-line pixel array by means of a control device, reading out at least a second pixel value of the second pixel ($7a\_2$) of the first in-line pixel array ($7a$) and a second pixel value of the second pixel ($7b\_2$) of the second in-line pixel array ($7b$) by means of a control device and calculating a respective average value by means of a line-averaging acquisition method from the first pixel values and the second pixel values by means of a control device and providing a respective pixel value for further processing by means of a control device, and/or switching in operation between a 100 dots per inch resolution and a 200 dots per inch resolution by means of software and/or by means of a control device.

The term analog binning, as used herein, refers to a process in which charge that may be collected in quantum wells from two or more pixels is physically combined. With analog binning, the readout speed for a line may be shortened.

The term digital binning as used herein refers to a process in which individual pixel values are read, digitized, added, and possibly averaged.

As used herein, the term line-averaging acquisition mode refers to, for example, a mode of operation of a control device described herein and a device and/or method described herein. In a line-averaging acquisition mode, a line acquisition may be performed when both a first line and a second line of a contact image sensor are exposed. When an acquisition of a first line and a second line is completed, pixel values of the first line and pixel values of the second line may be averaged or, more particularly, an average may be generated. The averaging may be performed as follows: The value of pixel 1 in a first row A is added to the value of pixel 1 in a second row B and the sum of pixel values is divided by the number 2. The result may be rounded up. The value of pixel 2 in a first line A is added to the value of pixel 2 in a second line B and the sum of pixel values is divided by the number 2. The result may be rounded up. The value of pixel 3 in the first line A is added to the value of pixel 3 in the second line B and the sum of the pixel values is divided by the number 2. The result may be rounded up and so on. The averaged values may then be transmitted by the contact image sensor for further processing as if they came from a single line.

The devices and methods described herein may provide moiré-free sensor data, which is a basis for reliable detection of stains, graffiti, and other defacements. Graffiti is scribbling on banknotes. Because measurement reproducibility is improved by the method described herein, fine structures on the banknote may be better captured, such as a serial number, see-through register, barcode, clear text, microperforation, microprinting, Omron rings, thin cracks, and hue measurements become more accurate.

As used herein, the term CMOS or Complementary-Metal-Oxide-Semiconductor refers to semiconductor devices in which both p-channel and n-channel MOSFETs may be used on a common substrate. Furthermore, a charge coupled device array (CCD array) may also be used.

The term contact image sensor or contact imaging sensor (CIS) as used herein refers to a low-cost CMOS-based technology for image sensors. A contact image sensor is usually a line sensor in which a plurality of light-sensitive dots or pixels are arranged in a row. Above each of these dots may be a tiny plastic lens. A lens may cover a plurality of pixels and/or a pixel may collect light from a plurality of lenses. The illumination of the object to be captured may usually be provided by light source LEDs mounted parallel to the sensors—in the case of color scanners, by light source RGB LEDs. For image capture, the sensor may require almost direct contact with the original.

The above described embodiments and stated advantages relate to the device and method for improving the reproducibility of captures.

Figure 2:
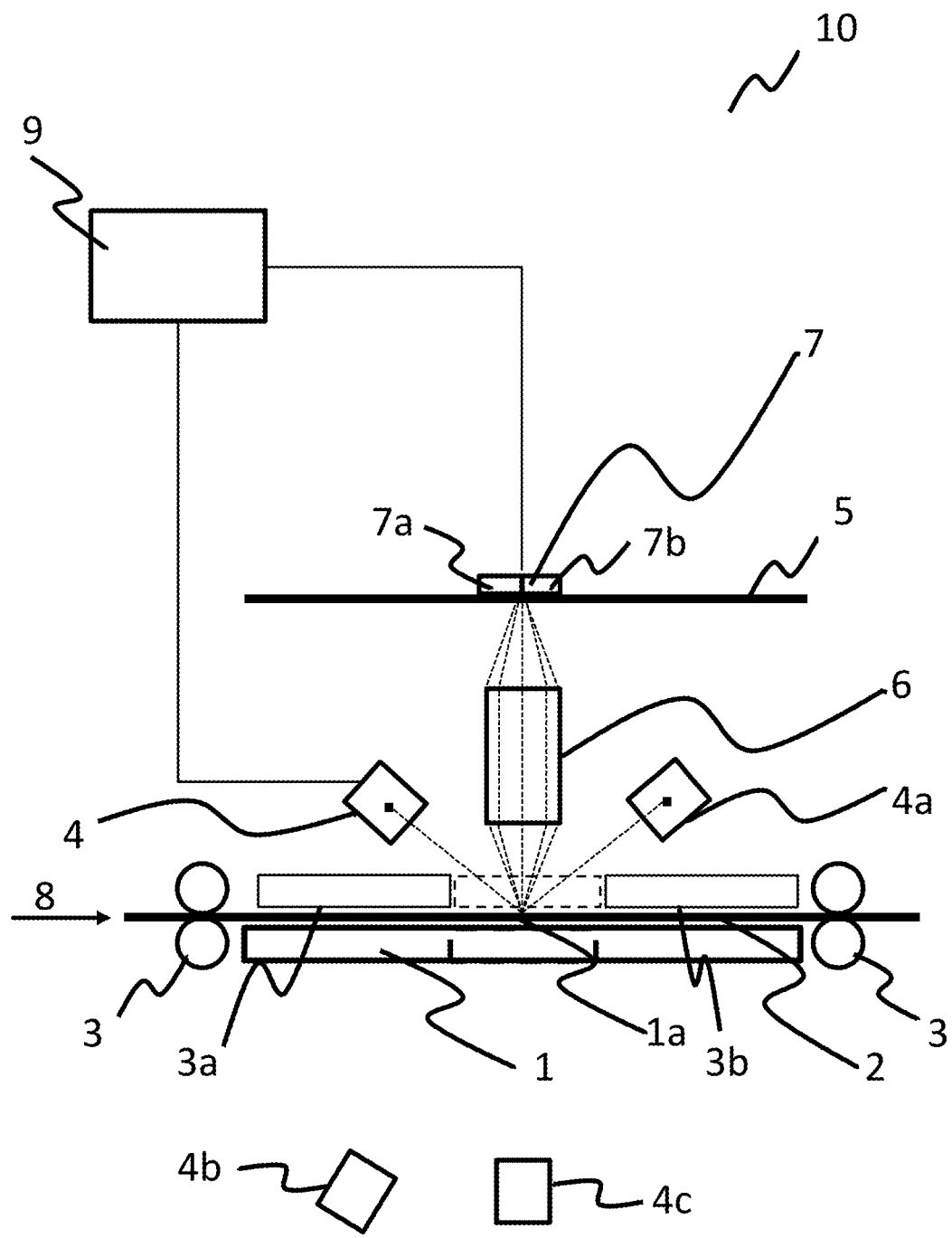
Figure 3:
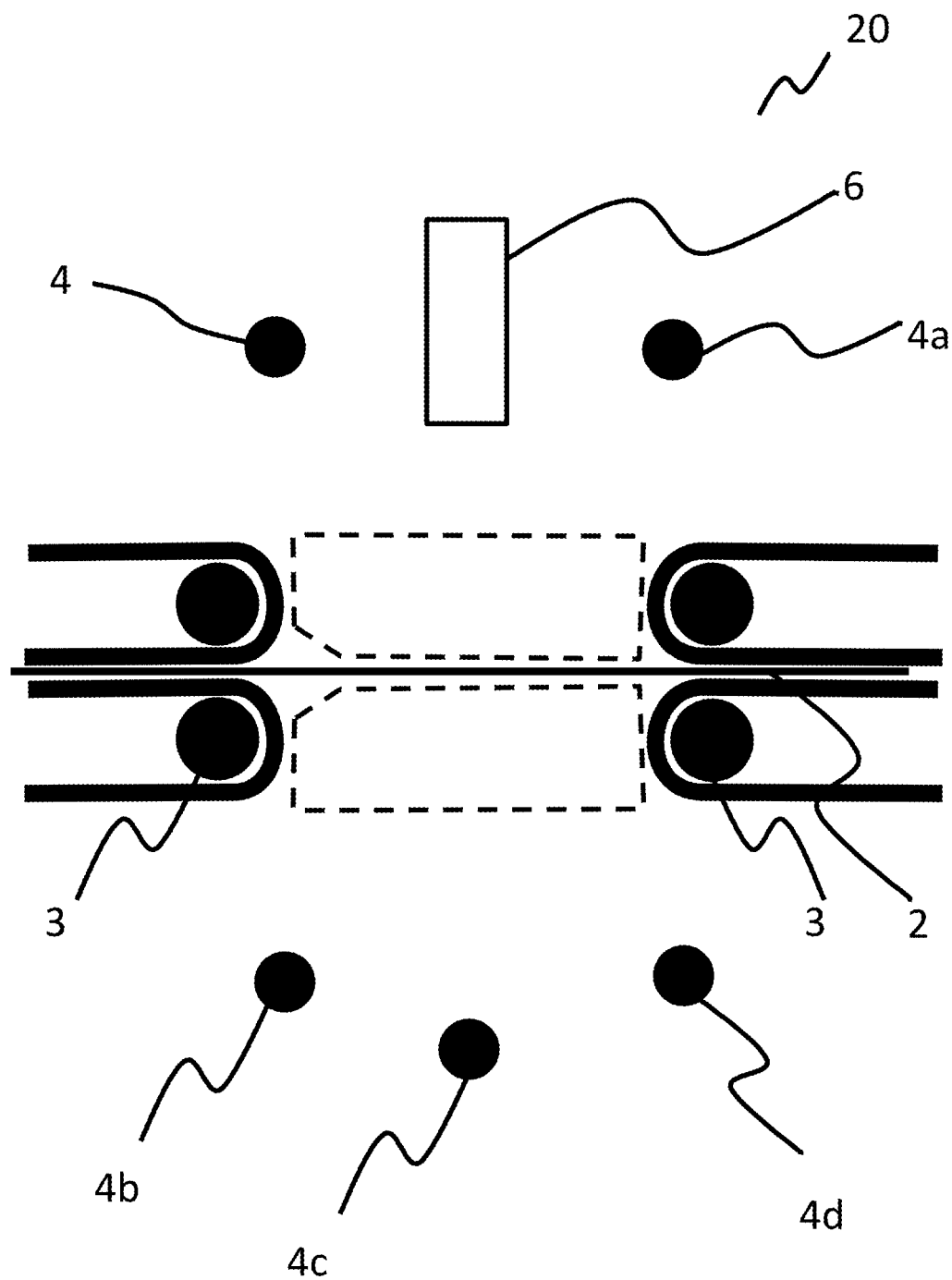
Figure 5:
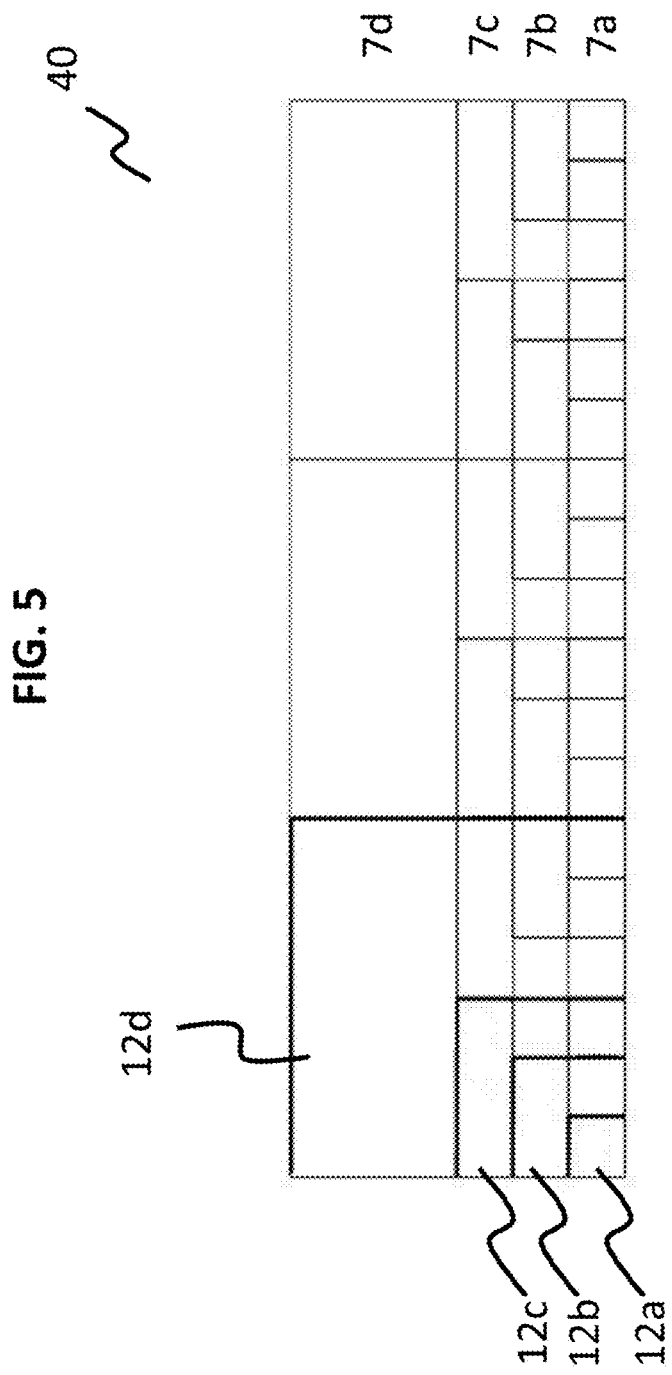
Figure 6:
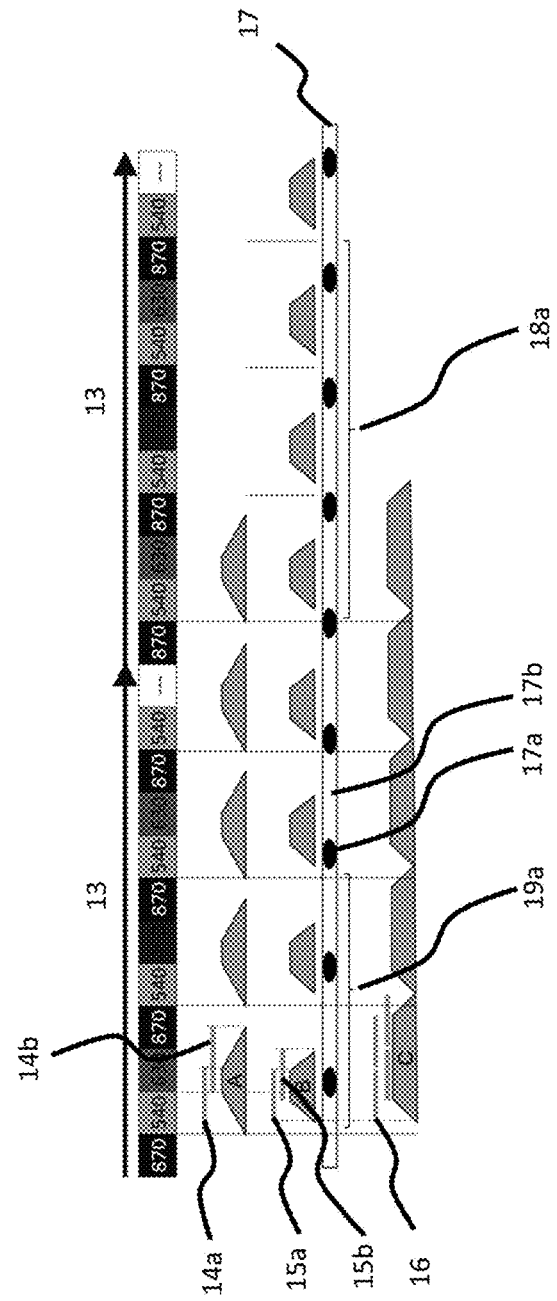

Examples of embodiments of the invention are shown in the figures and are explained in more detail below. Shown are:

FIG. 1A, FIG. 1B, FIG. 1C, schematic illustrations of a moiré effect based on a banknote;

FIG. 2, a schematic diagram of a device for improving the reproducibility of captures according to various embodiments;

FIG. 3, a schematic diagram of a device for improving the reproducibility of captures according to various embodiments;

FIG. 4A, FIG. 4B, FIG. 4C, FIG. 4D, schematic illustrations of a portion of a device and a method for improving the reproducibility of captures according to various embodiments;

FIG. 5, a schematic representation of a portion of a device for improving the reproducibility of captures according to various embodiments;

FIG. 6, a schematic representation of a portion of a device for improving the reproducibility of captures according to various embodiments; and FIG. 7, a schematic flowchart schematically illustrating a method for improving the reproducibility of captures according to various embodiments.

In the following detailed description, reference is made to the accompanying drawings which form part of the present application and in which are shown, for illustrative purposes, specific embodiments in which the invention may be practiced.

In this regard, directional terminology such as "top", "bottom", "front", "rear", "forward", "rearward", etc. is used with reference to the orientation of the figure(s) described. Since components of embodiments may be positioned in a number of different orientations, the directional terminology is for illustrative purposes and is not limiting in any way. It is understood that other embodiments may be used and structural or logical changes may be made without departing from the scope of protection of the present invention.

Further, it is understood that the features of the various exemplary embodiments described herein may be combined with each other, unless specifically stated otherwise.

The following detailed description is therefore not to be construed in a limiting sense, and the scope of protection of the present invention is defined by the appended claims.

FIG. 1A, FIG. 1B, and FIG. 1C show a schematic representation of moiré effects on the same 50-euro banknote 100 when pulled at different angles in the transport direction by a banknote reader.

FIG. 2 is a schematic diagram of a device 10 for improving the reproducibility of captures according to various embodiments.

The device 10 for improving the reproducibility of captures comprises a guide device 1 configured to guide at least one object 2 in the object plane 1a, at least one driving device 3 configured to transport the object 2 on the guide device 1 in the object plane 1a in a transport direction 8 at least one light source 4 for illuminating the object 2, an image plane 5, a plurality of rod-shaped lenses 6 arranged between the object plane 1a and the image plane 5 and in a row along a direction transverse to the transport direction 8 of the object 2, at least one light-sensitive in-line pixel array 7 of a contact image sensor arranged in the image plane 5, a control device 9 which is configured to control at least the light source 4 and/or the in-line pixel array 7 and to capture a signal generated by the in-line pixel array, wherein a light emitted by the light source 4 is at least partially scattered by the object 2 towards the rod-shaped lenses 6, is imaged by means of the rod-shaped lenses 6 and contacts at least a region of the in-line pixel array 7 wherein the contact image sensor comprises a plurality of one-dimensional in-line pixel arrays 7a, 7b each extending along the direction transverse to the transport direction 8 of the object 2, arranged parallel to each other and adjacent to each other, and wherein each in-line pixel array 7a, 7b has a length transverse to the transport direction 8 of the object 2 which completely covers the object 2 to be captured.

An object 2, for example a check or a banknote, may be transported from a first side by means of the driving device 3 along the object plane 1a or also in the opposite direction (bidirectional). The driving device 3 may comprise a plurality of rollers capable of transporting an object 2 in or against the transport direction 8. At least one roller may be driven by means of a motor. The device 10 may comprise a plurality of light sources 4, 4a, 4b, 4c, 4d. At least one light source may be used for an incident light operation, for example light sources 4 and 4a. At least one light source may be used for a transmitted light operation, for example the light sources 4b and 4c. As the object 2 travels along the transport direction 8 at a predefined speed, the light sources 4, 4a emit at least one light with one or more defined wavelengths. The emitted light is partially absorbed by the object 2 located below and partially scattered or reflected in a direction towards the rod-shaped lenses 6. The light sources 4, 4a may be rod-shaped so that the light illuminates a strip of the object approximately simultaneously. Part of the scattered or reflected light is optically imaged by means of the rod-shaped lenses 6 onto the image plane 5 and part falls onto the two adjacently arranged one-dimensional line pixel arrays 7a, 7b, as exemplarily shown in FIG. 2.

The device 10 illustrated in FIG. 2 may comprise a light source 4. In the device 10 illustrated with reference to FIG. 2, at least one light source 4, 4a may be arranged at different angles to the object plane. For example, the light source 4, 4a may be positioned at an angle to the object plane 1a in a range of values from about 10 degrees to about 80 degrees, for example in a range of values from about 15 degrees to about 75 degrees, for example at an angle of about 45 degrees to the object plane 1a. For example, the light source 4 may be positioned at an angle of about 50 degrees and the second light source 4a may be positioned at an angle of about 60 degrees to the object plane 1a. The light sources 4 and 4a may be arranged symmetrically with respect to the plurality of rod-shaped lenses. Simultaneous illumination may allow the illumination to be more diffuse, or time multiplexing may allow angle-dependent scattering to be evaluated. The device 10 may be operated by incident light using at least the light source 4 and/or 4a. The device 10 may further be operated by means of a transmitted light operation, for example a bright field operation and/or a dark field operation. For example, the device 10 may operate a light source 4b in a dark field transmitted light operation. The device 10 may operate, for example, a light source 4c in a bright field transmitted light operation. The light sources 4b, 4c may be arranged on a different side with respect to the object plane 1a compared to at least one of the light sources 4, 4a. For example, the light source 4c, when operated as a bright field light source, may be arranged approximately on an optical axis of a rod-shaped lens 6, for example approximately below the rod-shaped lens 6 shown in FIG. 2. The light source 4b may be arranged adjacent to the light source 4c and on the same side with respect to the object plane 1a.

At least one of the light sources 4, 4a, 4b, 4c may be operated by means of time-division multiplex illumination. The time-multiplexed illumination method may be with respect to a wavelength of an illumination and/or between incident and transmitted light and/or with respect to an illumination angle. For example, the control device 9 may operate the light sources 4 and 4a for a 940 nanometer (nm) incident light line simultaneously. For example, the control device may further operate the light source 4c for a 940 nm transmitted light line. In other words, for example, during a first time step the object may be illuminated with the color blue, during a second time step the object may be illuminated with green, during a third time step the object may be illuminated with red, and during a fourth time step the object may be illuminated with infrared. During each illumination step, the two lines 7a, 7b of the photosensitive in-line pixel array 7, for example CMOS lines, may measure at least one pixel value and the control device 9 may receive and export data in analog or digital form. The control device 9 may be located in the device 10 or may be located remotely.

The guide device 1 may be formed to be transparent, for example translucent, in a partial region, for example in a transmitted light operation of the device 10. The device 10 may further comprise guides 3a and 3b for guiding an object 2. The guides 3a and 3b may be arranged opposite to the guide device 1 with respect to an object 2. The guides 3a may be configured to be transparent, for example translucent, at least in a partial region, for example in a transmitted light operation of the device 10, as schematically illustrated in FIG. 2. In the region of illumination and/or optical imaging, portions of the guide device may be absent to provide illumination and/or optical imaging.

The control device 9 is configured to operate the first in-line pixel array 7a and the second in-line pixel array 7b independently of each other, and to connect the second in-line pixel array 7b to the first in-line pixel array 7a and vice versa. Exemplarily, the plurality of in-line pixel arrays 7a, 7b have a resolution in the direction transverse to the transport direction 8 of 200 dpi. A pixel of the plurality of in-line pixel arrays 7a, 7b may comprise a size of 127 microns by 127 microns.

The control device 9 is configured, in a case where the object 2 is at least one check, to set a resolution of the first in-line pixel array 7a to 200 dpi, to disable the second in-line pixel array 7b, to drive the first in-line pixel array 7a, and to read out the pixel values of the first in-line pixel array 7a.

The control device 9 is further configured, in a case where the object 2 is at least one banknote, to set a resolution of the first in-line pixel array 7a and the second in-line pixel array 7b to 100 dpi, to activate the first and the second in-line pixel arrays 7a, 7b, to read out and combine at least two pixel values of adjacent pixels 7a_1, 7a_2 in the first in-line pixel array 7a, at least two pixel values of adjacent pixels 7a_1, 7a_2 in the first in-line pixel array 7a, reading out and combining at least two pixel values of adjacent pixels 7b_1, 7b_2 in the second in-line pixel array 7b corresponding to the two adjacent pixels 7a_1, 7a_2 in the first in-line pixel array 7a, combining the two combined adjacent pixels 7a_1, 7a_2 in the first in-line pixel array 7a and the two combined adjacent pixels 7b_1, 7b_2 in the second in-line pixel array 7b, and providing a pixel value based on the combined pixel values for further processing.

The control device 9 is further configured to combine pixel values of two adjacent pixels 7a_1, 7a_2 of the first in-line pixel array 7a and pixel values of two adjacent pixels 7b_1, 7b_2 of the second in-line pixel array 7b corresponding to the two adjacent pixels 7a_1, 7a_2 of the first in-line pixel array 7a using an analog 2×2 binning method, and to provide a pixel value based on the combined pixel values for further processing.

The control device 9 is further configured to activate the first and second in-line pixel arrays 7a, 7b, to read out at least a first pixel value of a first pixel 7a_1 of the first in-line pixel array 7a and a first pixel value of a first pixel 7b_1 of the second in-line pixel array 7b, reading out at least a second pixel value of the second pixel 7a_2 of the first in-line pixel array 7a and a second pixel value of the second pixel 7b_2 of the second in-line pixel array 7b, and calculating in each case an average value by means of a line-averaging acquisition method from the first pixel values and the second pixel values and providing in each case a pixel value for further processing.

The second light source 4a may be arranged as a reflected light source mirrored with respect to the light source 4 with respect to a plane perpendicular to the object plane 1, parallel to the rod-shaped lenses 6 and passing through a central optical axis of the rod-shaped lenses 6. The incident light source 4a may be provided to position the light source 4a at various angles with respect to an object guide 1, for example, in a range of values from about 30 degrees to about 60 degrees, for example, at an angle of about 45 degrees. Further, at least one transmitted-light light source 4b, 4c may be provided. Further, at least one light source may be operated as a transmitted-light light source. The transmitted-light light source may be arranged on an opposite side with respect to a guide device 1 as the image plane.

The device 10 comprises a row of rod-shaped lenses 6 or a plurality of rows of rod-shaped lenses 6 arranged in series, wherein the rows of rod-shaped lenses 6 are arranged parallel to each other, and wherein the rows are each arranged transverse to the transport device 8.

In various embodiments, at least a first row of the plurality of rows of rod-shaped lenses 6 may be arranged adjacent to at least one further row of the plurality of rod-shaped lenses, wherein the first row of rod-shaped lenses 6 and the further row of rod-shaped lenses may be arranged in a direction transverse to the transport direction of the object 2 at a predefined distance, for example in a range of values from about 1 micrometer to about 10 micrometers, for example at a distance of 2 micrometers, for example of 4 micrometers, for example of 7 micrometers for example 9 micrometers, and may be arranged offset from one another by a predefined distance, for example in a range of values from about 0 micrometers to about 400 micrometers, for example from 130 micrometers to about 340 micrometers, for example at a distance of about 190 micrometers, transverse to the transport direction 8, and/or at least one intermediate space between a rod-shaped lens 6 and an adjacent rod-shaped lens may be filled with at least one filling material, for example black silicon resin or black silicon resin, for example.

In various embodiments, the device described herein may be operated by a method described herein for improving the reproducibility of captures. The method may comprise: at least one of guiding at least one object 2 on a guide device 1 in an object plane 1a by means of the guide device 1, transporting the object 2 on the guide device 1 in the object plane 1a in a transport direction 8 by means of at least one driving device 3, illuminating the object 2 by means of at least one light source 4, at least partially scattering light emitted from the light source 4 from the object 2 towards the rod-shaped lenses 6, transmitting at least part of the light scattered from the object 2 by means of a plurality of rod-shaped lenses 6 arranged between the object plane 1a and an image plane 5 and in a row along a direction transverse to the transport direction 8 of the object 2 to a light-sensitive in-line pixel array 7, controlling at least one of the light source 4 and the in-line pixel array 7 by means of a control device 9, wherein the in-line pixel array 7 comprises a plurality of one-dimensional in-line pixel arrays 7a, 7b, each extending along the direction transverse to the transport direction 8 of the object 2, arranged parallel to each other and adjacent to each other, and wherein each in-line pixel array 7a, 7b has a length transverse to the transport direction 8 of the object 2 which completely covers the object 2 to be captured, capturing the light imaged by the rod-shaped lenses 6 by means of at least one region of a light-sensitive in-line pixel array 7 arranged in the image plane 5, and combining at least individual pixel values of the plurality of one-dimensional in-line pixel arrays 7a, 7b and providing a pixel value for further processing by means of the control device 9.

Although in FIG. 2 the transport direction 8 is shown in a first direction, the transport direction 8 may also be in a direction opposite to that shown in FIG. 2. The device 10 may further be configured to transport the object 2 in both a first transport direction 8 and a second transport direction opposite to the first transport direction.

FIG. 3 is a schematic diagram of a device 20 for improving the reproducibility of captures according to various embodiments.

The device 20 described with reference to FIG. 3 may comprise at least one or all of the features of the device 10 described with reference to FIG. 2. The reference signs illustrated in FIG. 3 correspond to reference signs used with respect to FIG. 2.

The device 20 in FIG. 3, with certain components omitted or not shown for ease of understanding, comprises a plurality of light sources 4, 4a, 4b, 4c, and 4d. For example, a banknote or check may be transported by a plurality of belts, as exemplified in FIG. 3. The device 20 may be operated, for example, in a reflected light mode in which at least one light source 4, 4a is operated to illuminate at least one object 2 that may be transported in the device 20. For example, the device 20 may be operated in a transmitted light mode in which at least one light source 4b, 4c, 4d is operated to illuminate the object 2. For example, the light source 4b and/or 4d may be operated in a dark field transmitted light mode. For example, the light source 4c may be operated in a bright field transmitted light mode. In other words, at least one light source 4, 4a may be arranged on the same side (incident light measurement) with respect to the object plane and/or at least one light source 4b, 4c, 4d may be on the opposite side (transmitted light measurement) as the image plane. The arrangements of the light sources 4, 4a, 4b, 4c, 4d in FIG. 3 illustrate one possible arrangement. In various embodiments, the light sources 4, 4a, 4b, 4c, 4d may comprise other positions.

FIG. 4A, FIG. 4B, FIG. 4C, FIG. 4D are schematic diagrams of a portion of a device and method for improving the reproducibility of captures according to various embodiments. FIG. 4A, FIG. 4B, FIG. 4C, and FIG. 4D each show a diagram schematically illustrating a contact image sensor 10 having two one-dimensional in-line pixel arrays 7a, 7b according to various embodiments. The first in-line pixel array 7a comprises a plurality of pixels 7a_1, 7a_2. The second in-line pixel array 7b comprises a plurality of pixels 7b_1, 7b_2. Each pixel of the plurality of pixels 7a_1, 7a_2, 7b_1, 7b_2 may be read out, for example, by means of the control device 9.

Figure 4A:
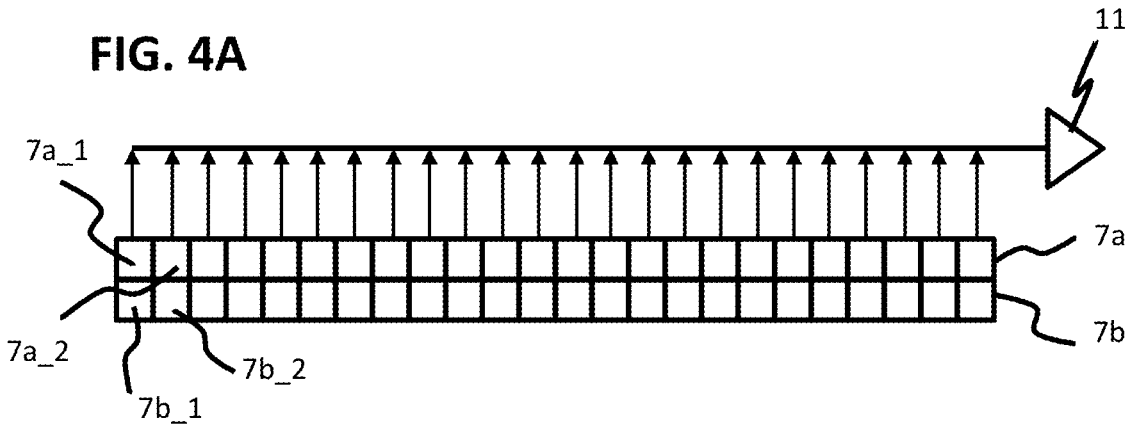

FIG. 4A shows a resting state of the contact image sensor 10 with two one-dimensional in-line pixel arrays 7a, 7b according to various embodiments.

Figure 4B:
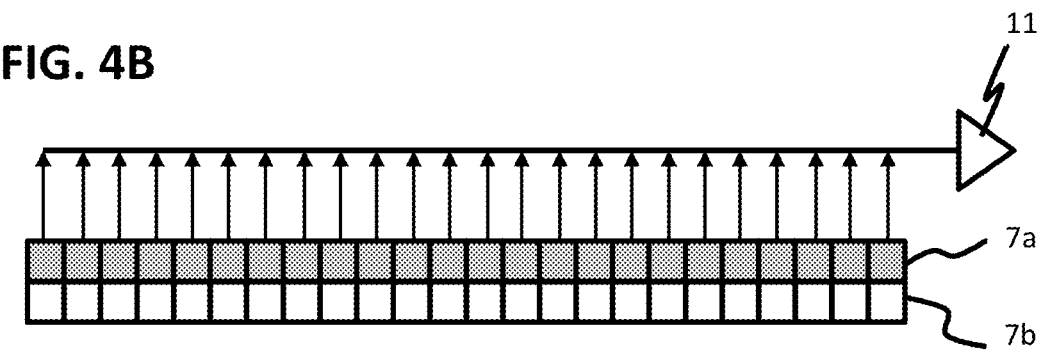

FIG. 4B shows a first operating state (check operation) of the contact image sensor 10 with two one-dimensional in-line pixel arrays 7a, 7b according to various embodiments. In the first operating state, the control device 9 is configured to set a resolution of the first in-line pixel array 7a to 200 dpi in a case where the object 2 is at least one check. Further, the control device 9 disables the second in-line pixel array 7b. The control device 9 controls the first in-line pixel array 7a and reads out the pixel values of the first in-line pixel array 7a, for example, in an intrinsic resolution.

Figure 4C:
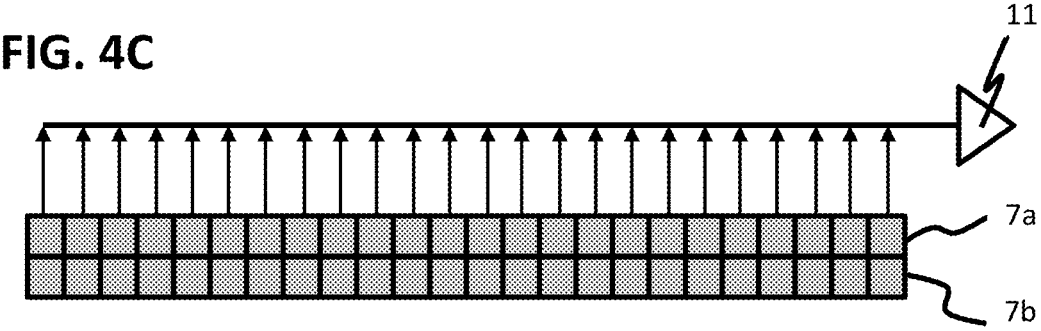

FIG. 4C shows a second operating state (banknote operation) of the contact image sensor 10 with two one-dimensional in-line pixel arrays 7a, 7b according to various embodiments. In the second operating state, the control device 9 is configured to set a resolution of the first in-line pixel array 7a and the second in-line pixel array 7b to 100 dpi in a case where the object 2 is at least one banknote. The control device 9 activates the first and second in-line pixel arrays 7a, 7b and reads out and combines at least two pixel values of adjacent pixels 7a_1, 7a_2 in the first in-line pixel array 7a. The control device 9 is further configured to read out and summarize at least two pixel values of adjacent pixels 7b_1, 7b_2 corresponding to the two adjacent pixels 7a_1, 7a_2 in the first in-line pixel array 7a in the second in-line pixel array 7b. The control device 9 is further configured to combine the two combined neighboring pixels 7a_1, 7a_2 in the first in-line pixel array 7a and the two combined neighboring pixels 7b_1, 7b_2 in the second in-line pixel array 7b, for example by means of a binning method, and to provide a pixel value based on the combined pixel values for further processing.

In various embodiments, the control device 9 is further configured to combine pixel values of two adjacent pixels 7a_1, 7a_2 of the first in-line pixel array 7a and pixel values of two adjacent pixels 7b_1, 7b_2 of the second in-line pixel array 7b corresponding to the two adjacent pixels 7a_1, 7a_2 of the first in-line pixel array 7a using a 2×2 binning method and provide a pixel value based on the combined pixel values for further processing. The control device operates the two lines at half resolution. The binning method enables higher light sensitivity per virtual pixel and a signal-to-noise ratio may be improved and a line may be read out faster.

In various embodiments, the control device 9 is further configured to enable the first and second in-line pixel arrays 7a, 7b to read out at least a first pixel value of a first pixel 7a_1 of the first in-line pixel array 7a and a first pixel value of a first pixel 7b_1 of the second in-line pixel array 7b. The control device 9 is further configured to read out at least a second pixel value of the second pixel 7a_2 of the first in-line pixel array 7a and a second pixel value of the second pixel 7b_2 of the second in-line pixel array 7b, and to calculate an average value in each case from the first pixel values and the second pixel values by means of a line-averaging acquisition method, and to provide a pixel value in each case for further processing.

For banknote operation at 100 dpi, two pixels in the line and two additional pixels in the transport direction are combined to form a single square pixel. This allows moiré-free scanning in the transport direction at 100 dpi, which permits higher processing speeds than with a conventional contact image sensor, where 200 dpi must be scanned in the transport direction for each color channel, which requires a contact image sensor with a higher line rate and generates more data.

The device and method for improving the reproducibility of captures may allow the same contact image sensor with different resolutions to be operated with the same performance as a contact image sensor specifically designed for that resolution, without significantly increasing the manufacturing costs by increasing the quantities of that model. For a banknote reader with a contact image sensor described herein, the resolution may be configured in operation without sacrificing performance compared to a contact image sensor designed only for the corresponding resolution or with two differently-designed contact image sensors, which increases cost, space requirements, and congestion risk. Such switching is necessary if the banknote reader must also be used for check operation and/or if color channels with different resolutions are operated in the illumination sequence.

The control device 9 may automatically switch between the modes of operation described with reference to FIGS. 4B and 4C. For example, it may be determined that the object is a check. Thereupon, the control device 9 may be set to the operating mode described with reference to FIG. 4B. For example, it may be determined that the object is at least one banknote. Thereupon, the control device 9 may be set to the operating mode described with reference to FIG. 4C. However, the operating modes may also change within the color sequence.

The individual pixel values may be read out and converted by means of an analog-to-digital converter 11, as shown schematically in FIG. 4A to FIG. 4D.

Figure 4D:
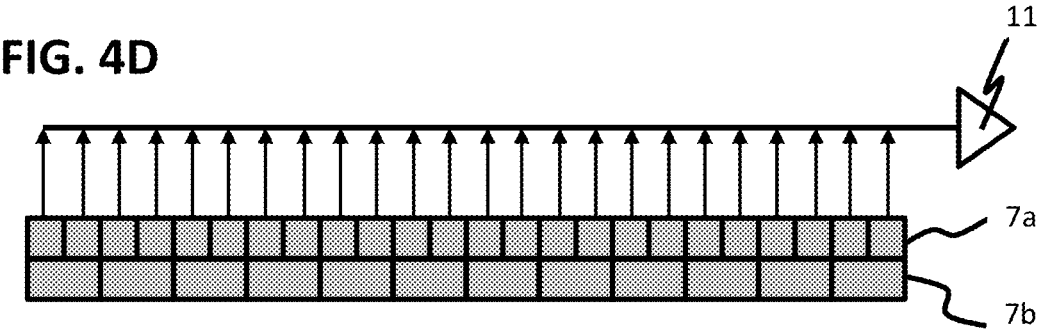

FIG. 4D shows another operating state of a contact image sensor with two one-dimensional in-line pixel arrays 7a, 7b according to various embodiments. As schematically illustrated in FIG. 4D, at least one pixel in at least one in-line pixel array transverse to the transport direction may be wider than a pixel in at least one other in-line pixel array. For example, a pixel in a first in-line pixel array may be wider relative to a corresponding pixel in a second in-line pixel array by, for example, a factor of about 1.5 to about a factor of 3.5, such as a factor of 2. In other words, a pixel width transverse to the transport direction of an object in a first row may be made twice as wide with respect to a pixel width in a second row. In other words, a first pixel of a row may comprise a width transverse to the transport direction of an object that, together, two pixels in an adjacent row comprise transverse to the transport direction. For example, a width across the transport direction of a pixel in a first in-line pixel array 7a and a pixel in a second in-line pixel array 7b may be 127 microns. With reference to FIG. 4D, a width transverse to the transport direction of a pixel in a first in-line pixel array 7a may be, for example, 127 micrometers and a width transverse to the transport direction of a pixel in a second in-line pixel array 7b may be, for example, 254 micrometers.

FIG. 5 is a schematic representation of a subsection 40 of a device for improving the reproducibility of captures according to various embodiments.

FIG. 5 illustrates an example of a sub-area 40 of a moiré-free contact image sensor in 100, 200, 300 and 600 dots per inch resolution. In a device 10, 20 for improving capture reproducibility, at least one pixel in at least one in-line pixel array may be wider than a pixel in at least one other in-line pixel array. For example, a first row may comprise a plurality of pixels of the same size (see pixel array in row 7a in FIG. 5). An adjacent row may comprise pixels of different widths, for example, pixels that are twice as wide as pixels in the first row. For example, a second row may comprise a pixel sequence of: a pixel with pixel width of two pixels, a pixel with pixel width of one pixel of the first row, a pixel with pixel width of one pixel, a pixel with pixel width of two pixels (see pixel sequence in row 7b in FIG. 5). This sequence may be repeated in the second row. In a third row, a pixel may comprise a pixel width of: a pixel having pixel width of three pixels of the first row. This pixel width may repeat in the third row (see pixel sequence in row 7c in FIG. 5). In a fourth row, a pixel may comprise a pixel width of six pixels of the first row. This width may repeat in the fourth row (see pixel sequence in row 7d in FIG. 5). For example, the height of the pixels of the fourth row may be three pixel heights of the pixels of the first row.

A bottom line 7a may be designed for 600 dots per inch, see 12a. If a resolution of 300 dots per inch is to be captured, a pixel area may be enlarged by means of an analog binning to the pixel area 12b. If a resolution of 200 dots per inch is to be captured, a pixel area may be enlarged to a pixel area 12c by means of an analog binning. If a resolution of 100 dots per inch is to be captured, a pixel area may be enlarged to a pixel area 12d using an analog binning. In other words, pixels may be combined so as to form at least one larger pixel. In other words, a plurality of pixels in at least one line or in a plurality of lines may be combined such that a respective resolution, for example 100 dots per inch, may be realized. For a 300 dots per inch resolution, two adjacent pixels may be connected together in a first row and corresponding pixels may be connected together in a second row (see 12b), which in turn may be connected together, as schematically illustrated in FIG. 5. Each pixel area 12b, 12c, 12d shown in FIG. 5 may be individually connected or combined using an analog binning process.

FIG. 6 is a schematic representation of a portion of a device and method for improving the reproducibility of captures according to various embodiments.

FIG. 6 illustrates an illumination sequence in which a contact image sensor may be designed to have a resolution of 200 dpi, for example. The contact image sensor illustrated in FIG. 6 may be, for example, a contact image sensor described herein. The segments 13 in FIG. 6 may have a length of, for example, about 1016 micrometers. A pitch, i.e., a step size between adjacent pixels transverse to the transport direction, may be, for example, about 127 micrometers in the one-dimensional pixel array 7a, 7b. An extent of a pixel in transport direction 8 then cannot exceed the 127 micrometers, otherwise the resolution in transport direction would deteriorate. That is, in transport direction 8, pixel 7a instantaneously captures 127 microns if rod-shaped lens 6 could image perfectly. The segment 14a, for example having a length of about 127 micrometers, represents a segment at a time when at least one of the light sources 4, 4a, 4b, 4c, 4d, for example an LED, is turned on.

During the capture of the first line, for example a green line, the object 2, for example a banknote, moves in transport direction 8. At the end of the capture of the first line, the capture location is shifted by about 1016 micrometers divided by 12 (see the segment 14b in FIG. 6). The sensitivity of an ideal contact image sensor 10 and/or in-line pixel array 7 in transport direction 8 is described by the trapezoids A in FIG. 6. Effectively, however, the pixel size in transport direction 8 for a contact image sensor and/or for a photosensitive in-line pixel array may be about 99 microns only. Therefore, the segments 15a, 15b in FIG. 6 are shorter. Further, because of timing constraints and to compensate for variations, illumination cannot occur throughout the line duration, but starts after line start and ends before line end, and therefore has a duty cycle significantly less than one. As used herein, duty cycle is a ratio between illumination duration and the inverse line rate. An inverse line rate may be understood as a line time, for example, as 1.016 microns/(12*v), where v indicates a velocity. Therefore, the segments 15a and 15b cover a smaller region than desired, or the slopes of the trapezoid B are steeper. The real sensitivity of, for example, a green channel in transport direction 8 is described by the trapezoids B in FIG. 6. This may be used to explain the occurrence of the moiré effect, for example for periodic or near-periodic pressure structures, which usually occur for lines that absorb or do not absorb, respectively, which have a similar frequency to the scanning. When the sensitive area falls on the absorbing print structure, it appears as dark. This is shown, for example, by means of a periodic structure 17 for the absorbing parts 17a for the green channel with sensitivity B in the region 19a in FIG. 6. When the sensitive area falls on the non-absorbing parts of the structure, this appears as bright. This is shown, for example, by means of a periodic bright structure 17b in region 18a in FIG. 6. When the banknote is captured several times, the absorbing structure may fall on the sensitive area one time and the non-absorbing structure another time for an examined area, for example, if the rasters are only slightly moved relative to each other.

In various embodiments, if at least a second, approximately identical pixel of a second one-dimensional in-line pixel array 7b is available in transport direction 8 to remove the moiré effect, and binning is performed with the first pixel of a first one-dimensional in-line pixel array 7a, for example (reference character 16 in FIG. 6), a sensitivity of, for example, a green channel in transport direction 8 may be established as described by the trapezoids C in FIG. 6. The gaps in sensitivity, as observed with trapezoids A and B in FIG. 6, have now virtually disappeared.

In various embodiments, if the second pixel in transport direction 8 is slightly longer than the first pixel in transport direction 8, for example by about a factor in a region of about 1.5 to about 1.7, for example by about a factor of 1.57 longer, the sensitivity may be approximately constant over the transport distance 8 (or over the banknote). This means that a moiré effect may no longer occur.

FIG. 7 is a flowchart schematically illustrating a method for improving the reproducibility of captures according to various embodiments.

The method for improving the reproducibility of captures may comprise at least one of the following: guiding at least one object in an object plane by means of a guide device (S701); transporting the object in the object plane in a transport direction by means of at least one driving device (S702); illuminating the object by means of at least one light source of a contact image sensor (S703); at least partially scattering a light emitted from the light source from the object toward a plurality of rod-shaped lenses of the contact image sensor (S704); imaging at least a portion of the light scattered from the object by means of the plurality of rod-shaped lenses arranged between the object plane and an image plane and in a row along a direction transverse to the transport direction of the object to at least one photosensitive in-line pixel array of the contact image sensor (S705); controlling at least one of the light source and the photosensitive in-line pixel array by means of a control device (S706), wherein the photosensitive in-line pixel array comprises a plurality of one-dimensional in-line pixel arrays each extending along the direction transverse to the transport direction of the object, arranged parallel to each other and adjacent to each other, and wherein each in-line pixel array has a length transverse to the transport direction of the object which completely covers the object to be detected, capturing at least part of the light imaged by the rod-shaped lenses by means of at least one region of a photosensitive in-line pixel array arranged in the image plane (S707), combining at least individual pixel values of the plurality of one-dimensional in-line pixel arrays (S708), and providing a pixel value for further processing by means of the control device (S709).

In various embodiments, the method may further comprise features described with respect to FIG. 1, FIG. 2, FIG. 3, FIG. 4, FIG. 5, and/or FIG. 6. The advantages described with respect to the embodiments of the device described herein relate equally to the embodiments of the method described herein, and vice versa.

Various aspects of this revelation are illustrated below:

Embodiment 1 is a device for improving the reproducibility of captures. The device may comprise: a guide device configured to guide at least one object in an object plane; at least one driving device configured to transport the object in the object plane in a transport direction, an image plane; at least one contact image sensor having at least one light source for illuminating the object, a plurality of rod-shaped lenses disposed between the object plane and the image plane and in a row along a direction transverse to the transport direction of the object, and at least one light-sensitive in-line pixel array disposed in the image plane; a control device configured to control at least one of the light source and the light-sensitive in-line pixel array and to capture a signal generated by the light-sensitive in-line pixel array, wherein a light emitted from the light source is at least partially scattered by the object toward the rod-shaped lenses, imaged by means of the rod-shaped lenses, and incident on at least a region of the light-sensitive in-line pixel array wherein the photosensitive in-line pixel array comprises a plurality of one-dimensional in-line pixel arrays each extending along the direction transverse to the transport direction of the object, arranged parallel to each other and adjacent to each other, and wherein each in-line pixel array has a length transverse to the transport direction of the object which completely covers the object to be captured.

In embodiment example 2, the subject matter of embodiment example 1 may optionally comprise that each in-line pixel array comprises a plurality of pixels, and each pixel comprises at least one CMOS or CCD-type photodiode for capturing a pixel value of the light emitted from the light source and/or wherein a number of the in-line pixel arrays is smaller than a number of the pixels in each in-line pixel array (7a; 7b).

In embodiment 3, the subject matter of embodiments 1 or 2 may optionally comprise at least a first in-line pixel array and a second in-line pixel array of the plurality of in-line pixel arrays being identically constructed.

In embodiment 4, the object of embodiment 1 or 2 may optionally comprise at least a second in-line pixel array of the plurality of in-line pixel arrays in the transport direction of the object being made longer than a first in-line pixel array of the plurality of in-line pixel arrays in the transport direction of the object. At least one pixel in at least one in-line pixel array may be configured to be wider across the transport direction than a pixel in at least one other in-line pixel array.

In embodiment 5, the subject matter of embodiments 1 to 4 may optionally comprise the control device being further configured to operate the first in-line pixel array and the second in-line pixel array independently of each other, and wherein the control device is configured to connect the second in-line pixel array to the first in-line pixel array.

In embodiment 6, the subject matter of embodiments 1 to 5 may optionally comprise the plurality of in-line pixel arrays having a resolution in the direction transverse to the transport direction of 200 dpi, or, one in-line pixel array having a resolution in the direction transverse to the transport direction of 200 dpi and a second in-line pixel array having a resolution in the direction transverse to the transport direction of 100 dpi.

In embodiment 7, the subject matter of embodiments 1 to 6 may optionally comprise a pixel of the plurality of in-line pixel arrays having a size of 127 micrometers by 127 micrometers.

In embodiment 8, the subject matter of embodiments 1 to 7 may optionally comprise the control device being further configured to, in a case where the object is at least one check, set a resolution of the first in-line pixel array to 200 dpi, disable the second in-line pixel array, drive the first in-line pixel array, and read out the pixel values of the first in-line pixel array.

In embodiment 9, the subject matter of embodiments 1 to 8 may optionally comprise the control device being further configured to, in a case where the object is at least one banknote, set a resolution of the first in-line pixel array and the second in-line pixel array to 100 dpi, activate the first in-line pixel array and the second in-line pixel array, at least one charge collected in quantum wells of two adjacent pixels in the first in-line pixel array physically combine and read out pixel values, physically combine and read out pixel values of at least one charge collected in potential wells of two adjacent pixels in the second in-line pixel array corresponding to the two adjacent pixels in the first in-line pixel array, and provide a pixel value based on the read out pixel values for further processing.

In embodiment 10, the subject matter of embodiments 1 to 7 may optionally comprise the control device being further configured to combine pixel values of two adjacent pixels of the first in-line pixel array and at least one pixel value of an adjacent pixel of the second in-line pixel array using an analog binning method, and to provide a pixel value based on the combined pixel values for further processing.

In embodiment 11, the subject matter of embodiments 1 to 10 may optionally comprise the control device being further configured to enable the first in-line pixel array and the second in-line pixel array, read out at least a first pixel value of a first pixel of the first in-line pixel array and a first pixel value of a first pixel of the second in-line pixel array, read out at least a second pixel value of the second pixel of the first in-line pixel array and a second pixel value of the second pixel of the second in-line pixel array, and calculate in each case an average value by means of a line-averaging acquisition method from the first pixel values and the second pixel values and to provide in each case a pixel value for further processing.

In embodiment 12, the subject matter of embodiments 1 to 11 may optionally comprise the device comprising at least a second light source for illuminating the object, wherein the second light source is arranged on an opposite side to the light source with respect to the plurality of rod-shaped lenses and/or the rod-shaped lenses are gradient index rod-shaped lenses.

In embodiment 13, the subject matter of embodiments 1 to 12 may optionally comprise the device comprising a plurality of rows of rod-shaped lenses arranged in series, wherein the rows of rod-shaped lenses are arranged parallel to each other, and wherein the rows are each arranged transverse to the transport device.

In embodiment 14, the object of embodiment 13 may optionally comprise at least a first row of the plurality of rows of rod-shaped lenses being arranged adjacent to at least a further row of the plurality of rod-shaped lenses, the first row of rod-shaped lenses and the further row of rod-shaped lenses being arranged at a predefined distance from each other in a direction transverse to the transport direction of the object and being arranged displaced from each other by a predefined distance transverse to the transport direction, and/or at least one gap between a rod-shaped lens and an adjacent rod-shaped lens being filled with at least one filler material.

Embodiment 15 is a method for improving capture reproducibility. The method for improving the reproducibility of captures may comprise: guiding at least one object in an object plane by means of a guide device; transporting the object in the object plane in a transport direction by means of at least one driving device; illuminating the object by means of at least one light source of a contact image sensor; at least partially scattering a light emitted from the light source from the object toward a plurality of rod-shaped lenses of the contact image sensor; imaging at least a portion of the light scattered from the object by means of the plurality of rod-shaped lenses arranged between the object plane and an image plane and in a row along a direction transverse to the transport direction of the object to at least one photosensitive in-line pixel array of the contact image sensor; controlling at least one of the light source and the photosensitive in-line pixel array by means of a control device, wherein the photosensitive in-line pixel array comprises a plurality of one-dimensional in-line pixel arrays each extending along the direction transverse to the transport direction of the object and arranged parallel to each other and adjacent to each other, and wherein each in-line pixel array has a length transverse to the transport direction of the object which completely covers the object to be detected; capturing the light imaged by the rod-shaped lenses by means of at least a region of a photosensitive in-line pixel array arranged in the image plane; and combining at least individual pixel values of the plurality of one-dimensional in-line pixel arrays and providing a pixel value for further processing by means of the control device.

Further advantageous embodiments of the methods will be apparent from the description of the devices described herein and vice versa.

The invention claimed is:

1. A device for improving the reproducibility of captures comprising:
    a guide device configured to guide at least one object in an object plane;
    at least one driving device configured to transport the object in the object plane in a transport direction;
    an image plane;
    at least one contact image sensor with at least one light source for illuminating the object;
    a plurality of rod-shaped lenses arranged between the object plane and the image plane and in a row along a direction transverse to the transport direction of the object;
    at least one light-sensitive in-line pixel array of a plurality of in-line pixel arrays arranged in the image plane; and
    a control device configured to control at least one of the light source and the light-sensitive in-line pixel array and to capture a signal generated by the light-sensitive in-line pixel array;
    wherein a light emitted by the light source is at least partially scattered by the object towards the rod-shaped lenses, is imaged by means of the rod-shaped lenses and contacts at least a region of the light-sensitive in-line pixel array;
    wherein the photosensitive in-line pixel array comprises a plurality of one-dimensional in-line pixel arrays each extending along the direction transverse to the transport direction of the object, arranged parallel to each other and adjacent to each other;
    wherein each in-line pixel array comprises a length transverse to the transport direction of the object which completely covers the object to be captured; and
    wherein at least a second in-line pixel array of the plurality of in-line pixel arrays in the transport direction of the object is made longer than a first in-line pixel array of the plurality of in-line pixel arrays in the transport direction of the object;
    wherein the control device is further configured to, in a case where the object is at least a check, set a resolution of the first in-line pixel array to 200 dpi, disable the second in-line pixel array, drive the first in-line pixel array, and read out the pixel values of the first in-line pixel array.

2. The device according to claim 1, wherein each in-line pixel array comprises a plurality of pixels and each pixel comprises at least one CMOS or CCD-type photodiode for capturing a pixel value of light emitted from the light source, and wherein a number of the in-line pixel arrays is smaller than a number of the pixels in each in-line pixel array.

3. The device according to claim 1, wherein at least one pixel in at least one in-line pixel array transverse to the transport direction is made wider than a pixel in at least one further in-line pixel array.

4. The device according to claim 1, wherein the control device is further configured to operate the first in-line pixel array and the second in-line pixel array independently of each other, and wherein the control device is configured to connect the second in-line pixel array to the first in-line pixel array.

5. The device according to claim 1, wherein the plurality of in-line pixel arrays comprises a resolution in the direction transverse to the transport direction of 200 dpi, or wherein one in-line pixel array of the plurality of in-line pixel arrays comprises a resolution in the direction transverse to the transport direction of 200 dpi and another in-line pixel array of the plurality of in-line pixel arrays comprises a resolution in the direction transverse to the transport direction of 100 dpi.

6. The device according to claim 1, wherein one pixel of the plurality of in-line pixel arrays comprises a size of 127 micrometers by 127 micrometers.

7. The device according to claim 1, wherein the device comprises at least a second light source for illuminating the object, wherein the second light source is arranged on an opposite side to the light source with respect to the plurality of rod-shaped lenses, and the rod-shaped lenses are gradient index rod-shaped lenses.

8. A device for improving the reproducibility of captures comprising:
    a guide device configured to guide at least one object in an object plane;
    at least one driving device configured to transport the object in the object plane in a transport direction;
    an image plane;
    at least one contact image sensor with at least one light source for illuminating the object;

a plurality of rod-shaped lenses arranged between the object plane and the image plane and in a row along a direction transverse to the transport direction of the object;

at least one light-sensitive in-line pixel array of a plurality of in-line pixel arrays arranged in the image plane; and a control device configured to control at least one of the light source and the light-sensitive in-line pixel array and to capture a signal generated by the light-sensitive in-line pixel array;

wherein a light emitted by the light source is at least partially scattered by the object towards the rod-shaped lenses, is imaged by means of the rod-shaped lenses and contacts at least a region of the light-sensitive in-line pixel array;

wherein the photosensitive in-line pixel array comprises a plurality of one-dimensional in-line pixel arrays each extending along the direction transverse to the transport direction of the object, arranged parallel to each other and adjacent to each other;

wherein each in-line pixel array comprises a length transverse to the transport direction of the object which completely covers the object to be captured; and wherein at least a second in-line pixel array of the plurality of in-line pixel arrays in the transport direction of the object is made longer than a first in-line pixel array of the plurality of in-line pixel arrays in the transport direction of the object;

wherein the control device is configured to, in a case where the object is at least a banknote, set a resolution of the first in-line pixel array and the second in-line pixel array to 100 dpi, activate the first and the second in-line pixel arrays, physically combine at least one charge collected in quantum wells of two adjacent pixels in the first in-line pixel array and read out pixel values, physically combine at least one charge collected in quantum wells of two adjacent pixels corresponding to the two adjacent pixels in the first in-line pixel array in the second in-line pixel array and read out pixel values, and provide a pixel value based on the read pixel values for further processing.

9. The device according to claim 8, wherein each in-line pixel array comprises a plurality of pixels and each pixel comprises at least one CMOS or CCD-type photodiode for capturing a pixel value of light emitted from the light source, and wherein a number of the in-line pixel arrays is smaller than a number of the pixels in each in-line pixel array.

10. The device according to claim 8, wherein at least one pixel in at least one in-line pixel array transverse to the transport direction is made wider than a pixel in at least one further in-line pixel array.

11. The device according to claim 8, wherein the control device is further configured to operate the first in-line pixel array and the second in-line pixel array independently of each other, and wherein the control device is configured to connect the second in-line pixel array to the first in-line pixel array.

12. The device according to claim 8, wherein the plurality of in-line pixel arrays comprises a resolution in the direction transverse to the transport direction of 200 dpi, or wherein one in-line pixel array of the plurality of in-line pixel arrays comprises a resolution in the direction transverse to the transport direction of 200 dpi and another in-line pixel array of the plurality of in-line pixel arrays comprises a resolution in the direction transverse to the transport direction of 100 dpi.

13. The device according to claim 8, wherein one pixel of the plurality of in-line pixel arrays comprises a size of 127 micrometers by 127 micrometers.

14. The device according to claim 8, wherein the device comprises at least a second light source for illuminating the object, wherein the second light source is arranged on an opposite side to the light source with respect to the plurality of rod-shaped lenses, and the rod-shaped lenses are gradient index rod-shaped lenses.

15. The device according to claim 8, wherein the device comprises at least a second light source for illuminating the object, wherein the second light source is arranged on an opposite side to the light source with respect to the plurality of rod-shaped lenses, and the rod-shaped lenses are gradient index rod-shaped lenses.

16. A device for improving the reproducibility of captures comprising:

a guide device configured to guide at least one object in an object plane;

at least one driving device configured to transport the object in the object plane in a transport direction;

an image plane;

at least one contact image sensor with at least one light source for illuminating the object;

a plurality of rod-shaped lenses arranged between the object plane and the image plane and in a row along a direction transverse to the transport direction of the object;

at least one light-sensitive in-line pixel array of a plurality of in-line pixel arrays arranged in the image plane; and a control device configured to control at least one of the light source and the light-sensitive in-line pixel array and to capture a signal generated by the light-sensitive in-line pixel array;

wherein a light emitted by the light source is at least partially scattered by the object towards the rod-shaped lenses, is imaged by means of the rod-shaped lenses and contacts at least a region of the light-sensitive in-line pixel array;

wherein the photosensitive in-line pixel array comprises a plurality of one-dimensional in-line pixel arrays each extending along the direction transverse to the transport direction of the object, arranged parallel to each other and adjacent to each other;

wherein each in-line pixel array comprises a length transverse to the transport direction of the object which completely covers the object to be captured; and wherein at least a second in-line pixel array of the plurality of in-line pixel arrays in the transport direction of the object is made longer than a first in-line pixel array of the plurality of in-line pixel arrays in the transport direction of the object;

wherein the control device is configured to, combine pixel values of two adjacent pixels of the first in-line pixel array and at least one pixel value of an adjacent pixel of the second in-line pixel array by means of an analog binning method, and provide a pixel value based on the combined pixel values for further processing.

17. The device according to claim 16, wherein each in-line pixel array comprises a plurality of pixels and each pixel comprises at least one CMOS or CCD-type photodiode for capturing a pixel value of light emitted from the light source, and wherein a number of the in-line pixel arrays is smaller than a number of the pixels in each in-line pixel array.

18. The device according to claim 16, wherein at least one pixel in at least one in-line pixel array transverse to the transport direction is made wider than a pixel in at least one further in-line pixel array.

19. The device according to claim 16, wherein the control device is further configured to operate the first in-line pixel array and the second in-line pixel array independently of each other, and wherein the control device is configured to connect the second in-line pixel array to the first in-line pixel array.

20. The device according to claim 16, wherein the plurality of in-line pixel arrays comprises a resolution in the direction transverse to the transport direction of 200 dpi, or wherein one in-line pixel array of the plurality of in-line pixel arrays comprises a resolution in the direction transverse to the transport direction of 200 dpi and another in-line pixel array of the plurality of in-line pixel arrays comprises a resolution in the direction transverse to the transport direction of 100 dpi.

21. The device according to claim 16, wherein one pixel of the plurality of in-line pixel arrays comprises a size of 127 micrometers by 127 micrometers.

22. The device according to claim 16, wherein the device comprises at least a second light source for illuminating the object, wherein the second light source is arranged on an opposite side to the light source with respect to the plurality of rod-shaped lenses, and the rod-shaped lenses are gradient index rod-shaped lenses.

23. A device for improving the reproducibility of captures comprising:
a guide device configured to guide at least one object in an object plane;
at least one driving device configured to transport the object in the object plane in a transport direction;
an image plane;
at least one contact image sensor with at least one light source for illuminating the object;
a plurality of rod-shaped lenses arranged between the object plane and the image plane and in a row along a direction transverse to the transport direction of the object;
at least one light-sensitive in-line pixel array of a plurality of in-line pixel arrays arranged in the image plane; and
a control device configured to control at least one of the light source and the light-sensitive in-line pixel array and to capture a signal generated by the light-sensitive in-line pixel array;
wherein a light emitted by the light source is at least partially scattered by the object towards the rod-shaped lenses, is imaged by means of the rod-shaped lenses and contacts at least a region of the light-sensitive in-line pixel array;
wherein the photosensitive in-line pixel array comprises a plurality of one-dimensional in-line pixel arrays each extending along the direction transverse to the transport direction of the object, arranged parallel to each other and adjacent to each other;
wherein each in-line pixel array comprises a length transverse to the transport direction of the object which completely covers the object to be captured; and
wherein at least a second in-line pixel array of the plurality of in-line pixel arrays in the transport direction of the object is made longer than a first in-line pixel array of the plurality of in-line pixel arrays in the transport direction of the object;
wherein the control device is further configured to, activate the first and the second in-line pixel arrays, read out at least a first pixel value of a first pixel of the first in-line pixel array and a first pixel value of a first pixel of the second in-line pixel array, read out at least a second pixel value of the second pixel of the first in-line pixel array and a second pixel value of the second pixel of the second in-line pixel array, and calculate in each case an average value by means of a line-averaging acquisition method from the first pixel values and the second pixel values and provide in each case a pixel value for further processing, and wherein the control device is further configured to switch operation between a 100 dots per inch resolution and a 200 dots per inch resolution by means of software.

24. The device according to claim 23, wherein each in-line pixel array comprises a plurality of pixels and each pixel comprises at least one CMOS or CCD-type photodiode for capturing a pixel value of light emitted from the light source, and wherein a number of the in-line pixel arrays is smaller than a number of the pixels in each in-line pixel array.

25. The device according to claim 23, wherein at least one pixel in at least one in-line pixel array transverse to the transport direction is made wider than a pixel in at least one further in-line pixel array.

26. The device according to claim 23, wherein the control device is further configured to operate the first in-line pixel array and the second in-line pixel array independently of each other, and wherein the control device is configured to connect the second in-line pixel array to the first in-line pixel array.

27. The device according to claim 23, wherein the plurality of in-line pixel arrays comprises a resolution in the direction transverse to the transport direction of 200 dpi, or wherein one in-line pixel array of the plurality of in-line pixel arrays comprises a resolution in the direction transverse to the transport direction of 200 dpi and another in-line pixel array of the plurality of in-line pixel arrays comprises a resolution in the direction transverse to the transport direction of 100 dpi.

28. The device according to claim 23, wherein one pixel of the plurality of in-line pixel arrays comprises a size of 127 micrometers by 127 micrometers.

29. A method for improving the reproducibility of captures, the method comprising:
guiding at least one object in an object plane by means of a guide device;
transporting the object in the object plane in a transport direction by means of at least one driving device;
illuminating the object by means of at least one light source of a contact image sensor;
at least partially scattering a light emitted from the light source from the object toward a plurality of rod-shaped lenses of the contact image sensor;
imaging at least part of the light scattered by the object by means of the plurality of rod-shaped lenses arranged between the object plane and an image plane and in a row along a direction transverse to the transport direction of the object to at least one light-sensitive in-line pixel array of the contact image sensor;
controlling at least the light source and the light-sensitive in-line pixel array by means of a control device,
wherein the photosensitive in-line pixel array comprises a plurality of one-dimensional in-line pixel arrays each extending along the direction transverse to the transport direction of the object, arranged parallel to and adjacent to each other, and wherein each in-line pixel array comprises a length transverse to the transport direction of the object which completely covers the object to be captured;

capturing at least part of the light imaged by the rod-shaped lenses by means of at least a region of a photosensitive in-line pixel array arranged in the image plane, and merging at least individual pixel values of the plurality of one-dimensional in-line pixel arrays and providing a pixel value for further processing by means of the control device, wherein at least a second in-line pixel array of the plurality of in-line pixel arrays in the transport direction of the object is made longer than a first in-line pixel array of the plurality of in-line pixel arrays in the transport direction of the object;

wherein the control device is further configured to, in a case where the object is at least a check, set a resolution of the first in-line pixel array to 200 dpi, disable the second in-line pixel array, drive the first in-line pixel array, and read out the pixel values of the first in-line pixel array.

30. A method for improving the reproducibility of captures, the method comprising:

guiding at least one object in an object plane by means of a guide device;

transporting the object in the object plane in a transport direction by means of at least one driving device;

illuminating the object by means of at least one light source of a contact image sensor;

at least partially scattering a light emitted from the light source from the object toward a plurality of rod-shaped lenses of the contact image sensor;

imaging at least part of the light scattered by the object by means of the plurality of rod-shaped lenses arranged between the object plane and an image plane and in a row along a direction transverse to the transport direction of the object to at least one light-sensitive in-line pixel array of the contact image sensor;

controlling at least the light source and the light-sensitive in-line pixel array by means of a control device, wherein the photosensitive in-line pixel array comprises a plurality of one-dimensional in-line pixel arrays each extending along the direction transverse to the transport direction of the object, arranged parallel to and adjacent to each other, and wherein each in-line pixel array comprises a length transverse to the transport direction of the object which completely covers the object to be captured;

capturing at least part of the light imaged by the rod-shaped lenses by means of at least a region of a photosensitive in-line pixel array arranged in the image plane, and merging at least individual pixel values of the plurality of one-dimensional in-line pixel arrays and providing a pixel value for further processing by means of the control device, wherein at least a second in-line pixel array of the plurality of in-line pixel arrays in the transport direction of the object is made longer than a first in-line pixel array of the plurality of in-line pixel arrays in the transport direction of the object;

wherein the control device is configured to, in a case where the object is at least a banknote, set a resolution of the first in-line pixel array and the second in-line pixel array to 100 dpi, activate the first and the second in-line pixel arrays, physically combine at least one charge collected in quantum wells of two adjacent pixels in the first in-line pixel array and read out pixel values, physically combine at least one charge collected in quantum wells of two adjacent pixels corresponding to the two adjacent pixels in the first in-line pixel array in the second in-line pixel array and read out pixel values, and provide a pixel value based on the read pixel values for further processing.

31. A method for improving the reproducibility of captures, the method comprising:

guiding at least one object in an object plane by means of a guide device;

transporting the object in the object plane in a transport direction by means of at least one driving device;

illuminating the object by means of at least one light source of a contact image sensor;

at least partially scattering a light emitted from the light source from the object toward a plurality of rod-shaped lenses of the contact image sensor;

imaging at least part of the light scattered by the object by means of the plurality of rod-shaped lenses arranged between the object plane and an image plane and in a row along a direction transverse to the transport direction of the object to at least one light-sensitive in-line pixel array of the contact image sensor;

controlling at least the light source and the light-sensitive in-line pixel array by means of a control device, wherein the photosensitive in-line pixel array comprises a plurality of one-dimensional in-line pixel arrays each extending along the direction transverse to the transport direction of the object, arranged parallel to and adjacent to each other, and wherein each in-line pixel array comprises a length transverse to the transport direction of the object which completely covers the object to be captured;

capturing at least part of the light imaged by the rod-shaped lenses by means of at least a region of a photosensitive in-line pixel array arranged in the image plane, and merging at least individual pixel values of the plurality of one-dimensional in-line pixel arrays and providing a pixel value for further processing by means of the control device, wherein at least a second in-line pixel array of the plurality of in-line pixel arrays in the transport direction of the object is made longer than a first in-line pixel array of the plurality of in-line pixel arrays in the transport direction of the object;

wherein the control device is configured to, combine pixel values of two adjacent pixels of the first in-line pixel array and at least one pixel value of an adjacent pixel of the second in-line pixel array by means of an analog binning method, and provide a pixel value based on the combined pixel values for further processing.

32. A method for improving the reproducibility of captures, the method comprising:

guiding at least one object in an object plane by means of a guide device;

transporting the object in the object plane in a transport direction by means of at least one driving device;

illuminating the object by means of at least one light source of a contact image sensor;

at least partially scattering a light emitted from the light source from the object toward a plurality of rod-shaped lenses of the contact image sensor;

imaging at least part of the light scattered by the object by means of the plurality of rod-shaped lenses arranged between the object plane and an image plane and in a row along a direction transverse to the transport direction of the object to at least one light-sensitive in-line pixel array of the contact image sensor;

controlling at least the light source and the light-sensitive in-line pixel array by means of a control device, wherein the photosensitive in-line pixel array comprises a plurality of one-dimensional in-line pixel arrays each extending along the direction transverse to the transport direction of the object, arranged parallel to and adjacent to each other, and wherein each in-line pixel array comprises a length transverse to the transport direction of the object which completely covers the object to be captured;

capturing at least part of the light imaged by the rod-shaped lenses by means of at least a region of a photosensitive in-line pixel array arranged in the image plane, and merging at least individual pixel values of the plurality of one-dimensional in-line pixel arrays and providing a pixel value for further processing by means of the control device, wherein at least a second in-line pixel array of the plurality of in-line pixel arrays in the transport direction of the object is made longer than a first in-line pixel array of the plurality of in-line pixel arrays in the transport direction of the object;

wherein the control device is further configured to, activate the first and the second in-line pixel arrays, read out at least a first pixel value of a first pixel of the first in-line pixel array and a first pixel value of a first pixel of the second in-line pixel array, read out at least a second pixel value of the second pixel of the first in-line pixel array and a second pixel value of the second pixel of the second in-line pixel array, and calculate in each case an average value by means of a line-averaging acquisition method from the first pixel values and the second pixel values and provide in each case a pixel value for further processing, and wherein the control device is further configured to switch operation between a 100 dots per inch resolution and a 200 dots per inch resolution by means of software.

* * * * *